US008565668B2

(12) United States Patent
Cohen

(10) Patent No.: US 8,565,668 B2
(45) Date of Patent: *Oct. 22, 2013

(54) SYSTEMS AND METHODS FOR COMPUTERIZED INTERACTIVE TRAINING

(75) Inventor: Martin L. Cohen, Los Angeles, CA (US)

(73) Assignee: BreakThrough PerformanceTech, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/300,496

(22) Filed: Nov. 18, 2011

(65) Prior Publication Data

US 2012/0258438 A1    Oct. 11, 2012

Related U.S. Application Data

(63) Continuation of application No. 11/340,891, filed on Jan. 27, 2006, now Pat. No. 8,068,780.

(60) Provisional application No. 60/647,983, filed on Jan. 28, 2005, provisional application No. 60/692,093, filed on Jun. 20, 2005, provisional application No. 60/731,994, filed on Nov. 1, 2005.

(51) Int. Cl.
*G09B 7/04* (2006.01)
*G09B 5/06* (2006.01)
*G09B 5/08* (2006.01)

(52) U.S. Cl.
USPC ........... 434/362; 434/219; 434/322; 434/323; 434/327; 434/350

(58) Field of Classification Search
USPC ......... 434/219, 247, 257, 258, 322, 323, 350, 434/362, 433
See application file for complete search history.

(56) References Cited

U.S. PATENT DOCUMENTS

| 4,015,344 A | 4/1977 | Michaels et al. |
| 4,459,114 A | 7/1984 | Barwick |
| 4,493,655 A | 1/1985 | Groff |
| 4,608,601 A | 8/1986 | Shreck et al. |

(Continued)

FOREIGN PATENT DOCUMENTS

| GB | 2271262 A | 4/1994 |
| JP | 2000330464 | 11/2000 |

(Continued)

OTHER PUBLICATIONS

International preliminary report on patentability; PCT Application No. PCT/US2006/003174, filed on Jan. 27, 2006. Mailing date: Apr. 9, 2009.

(Continued)

*Primary Examiner* — Nikolai A Gishnock
(74) *Attorney, Agent, or Firm* — Knobbe, Martens, Olson & Bear LLP

(57) ABSTRACT

The present invention is related to interactive training. In one embodiment, a training system presents a stored scenario to a user via a terminal. The user is provided with the ability to intervene and stop the pre-recorded scenario to identify an error in handling the situation presented in the scenario and/or an opportunity presented in the scenario. Once the user has intervened, the user can be presented with a question regarding the opportunity and/or error. The user is scored based in part on the number of errors and/or opportunities that the user identified and optionally on the user's response to the question.

26 Claims, 56 Drawing Sheets

THE TIME ALOTTED FOR EACH ERROR IS 5 SECONDS FROM THE TIME THE TRAVEL AGENT MAKES A WRONG STATEMENT.

FOR THE PURPOSE OF THIS TUTORIAL, THE ERROR WILL BE REVEALED TO YOU AND THE COUNTDOWN WILL BE SHOWN ON A CLOCK. HOWEVER, THIS WILL NOT BE THE CASE IN THE ACTUAL MODULES.

AS AN EXAMPLE, AN ERROR WILL OCCUR WHERE THE TRAVEL AGENT STATES THAT INGRID BERGMAN'S BIRTHPLACE IS IN FINLAND.

HERE THE ERROR WILL BE IDENTIFIED CORRECTLY WITHIN THE TIME ALLOTED.

◁GO BACK?
ⅡPAUSE

(56) References Cited

U.S. PATENT DOCUMENTS

| | | |
|---|---|---|
| 4,643,682 A | 2/1987 | Migler |
| 4,689,022 A | 8/1987 | Peers et al. |
| 4,745,468 A | 5/1988 | Von Kohorn |
| 5,006,987 A | 4/1991 | Harless |
| 5,056,792 A | 10/1991 | Helweg-Larsen et al. |
| 5,147,205 A | 9/1992 | Gross et al. |
| 5,533,110 A | 7/1996 | Pinard et al. |
| 5,722,418 A | 3/1998 | Bro |
| 5,980,429 A | 11/1999 | Nashner |
| 6,067,638 A | 5/2000 | Benitz et al. |
| 6,106,298 A | 8/2000 | Pollak |
| 6,113,645 A | 9/2000 | Benitz et al. |
| 6,125,356 A | 9/2000 | Brockman et al. |
| 6,155,834 A | 12/2000 | New, III |
| 6,171,112 B1 | 1/2001 | Clark et al. |
| 6,190,287 B1 | 2/2001 | Nashner |
| 6,236,955 B1 | 5/2001 | Summers |
| 6,296,487 B1 | 10/2001 | Lotecka |
| 6,319,130 B1 | 11/2001 | Ooseki et al. |
| 6,409,514 B1 | 6/2002 | Bull |
| 6,514,079 B1 | 2/2003 | McMenimen et al. |
| 6,516,300 B1 | 2/2003 | Rakshit et al. |
| 6,535,713 B1 | 3/2003 | Houlihan et al. |
| 6,589,055 B2 | 7/2003 | Osborne et al. |
| 6,632,158 B1 | 10/2003 | Nashner |
| 6,684,027 B1 | 1/2004 | Rosenberg |
| 6,705,869 B2 | 3/2004 | Schwartz |
| 6,722,888 B1 | 4/2004 | Macri et al. |
| 6,736,642 B2 | 5/2004 | Bajer et al. |
| 6,755,659 B2 | 6/2004 | LoSasso et al. |
| 6,909,874 B2 | 6/2005 | Holtz et al. |
| 6,913,466 B2 | 7/2005 | Stanfield et al. |
| 6,925,601 B2 | 8/2005 | Moore et al. |
| 6,944,586 B1 | 9/2005 | Harless et al. |
| 6,966,778 B2 | 11/2005 | Macri et al. |
| 6,976,846 B2 | 12/2005 | Dupont et al. |
| 6,988,239 B2 | 1/2006 | Womble et al. |
| 7,016,949 B1 | 3/2006 | Tagawa |
| 7,221,899 B2 | 5/2007 | Ohno et al. |
| 2002/0059376 A1 | 5/2002 | Schwartz |
| 2002/0119434 A1 | 8/2002 | Beams et al. |
| 2003/0059750 A1 | 3/2003 | Bindler et al. |
| 2003/0065524 A1 | 4/2003 | Giacchetti et al. |
| 2003/0127105 A1 | 7/2003 | Fontana |
| 2003/0180699 A1 | 9/2003 | Resor |
| 2004/0014016 A1 | 1/2004 | Popeck et al. |
| 2004/0018477 A1 | 1/2004 | Olsen |
| 2004/0043362 A1 | 3/2004 | Aughenbaugh et al. |
| 2004/0166484 A1 | 8/2004 | Budke et al. |
| 2005/0004789 A1 | 1/2005 | Summers |
| 2005/0026131 A1 | 2/2005 | Elzinga et al. |
| 2005/0054444 A1 | 3/2005 | Okada |
| 2005/0089834 A1 | 4/2005 | Shapiro |
| 2005/0170326 A1 | 8/2005 | Koehler et al. |
| 2006/0048064 A1 | 3/2006 | Vronay |
| 2006/0074689 A1 | 4/2006 | Cosatto et al. |
| 2006/0078863 A1 | 4/2006 | Coleman et al. |
| 2006/0154225 A1 | 7/2006 | Kim |
| 2006/0177808 A1 | 8/2006 | Aosawa et al. |
| 2006/0204943 A1 | 9/2006 | Kimball |
| 2007/0015121 A1 | 1/2007 | Johnson et al. |
| 2007/0188502 A1 | 8/2007 | Bishop |
| 2007/0245305 A1 | 10/2007 | Anderson |
| 2007/0245505 A1 | 10/2007 | Abfall et al. |
| 2008/0182231 A1 | 7/2008 | Cohen et al. |
| 2008/0254419 A1 | 10/2008 | Cohen |
| 2008/0254423 A1 | 10/2008 | Cohen |
| 2008/0254424 A1 | 10/2008 | Cohen |
| 2008/0254425 A1 | 10/2008 | Cohen |
| 2008/0254426 A1 | 10/2008 | Cohen |
| 2010/0028846 A1 | 2/2010 | Cohen et al. |

FOREIGN PATENT DOCUMENTS

| | | |
|---|---|---|
| JP | 200272843 | 3/2002 |
| JP | 200489601 | 3/2004 |
| JP | 2004240234 | 8/2004 |
| WO | WO 8505715 | 12/1985 |

OTHER PUBLICATIONS

International Search Report and Written Opinion; PCT/US08/58781, Filing date: Mar. 28, 2008; mailed Oct. 1, 2008.

PCT International Search Report and Written Opinion, PCT Application No. PCT/US2009/051994, dated Sep. 23, 2009.

PCT International Search Report and Written Opinion; PCT/US 08/50806; International Filing Date: Jan. 10, 2008; Mailed Jul. 8, 2008.

English translation of Japanese Office Action regarding Japanese Patent Application No. 2007-553313, dated Mar. 12, 2012 and transmitted on Mar. 21, 2012.

First Examination Report from Indian Application No. 1209/MUMNP/2007, dated May 16, 2013, 4 pages.

Welcome to Advanced Listening Technologies (ALT)

Module 23

This Module is especially designed to improve the Financial Needs Analysis skills of Bankers and Managers.

You will listen to a fictional conversation between a Banker and Client (accompanied by on screen animation). This conversation contains a purpose-built Banker-Client interaction, designed with built in errors.

You will be required to listen intently for errors made by the Banker, identify these errors in real-time, and analyze them in detail.

You will also be required to keep track of any opportunities revealed by the Client, and to evaluate the Banker's communication style.

Financial Needs Analysis Profile

BACK        NEXT

FIG. 3B

General Overview

This conversation picks up right after the Banker has opened up a new Checking account for the Client who is new to the Bank. The Client is in a hurry to keep an appointment at a car dealership.

You are going to hear a Banker-Client interaction, the total length of which is about two and a half minutes.

The converstaion contains 11 errors made by the Banker. Your mission is to identify the errors when they occur, explain why they occur, and determine how to fix them.

Note: You may hear statements within the conversation during which the Client reveals opportunities not capitalized upon by the Banker. Do not click on the stop button in the case of these opportunities. The 11 errors will focus on Banker-Client interaction errors only, not missed opportunites. Even so, you should take note of these opportunities as you will be asked to identify them at the end of the interactive module.

BACK    NEXT

*FIG. 3C*

User Instructions

PART 1: Listening to the Conversation Uninterrupted

You will first be given the opportunity to listen to the entire conversation uninterrupted. Listen carefully for any errors, and take notes. Also listen and take notes of any opportunities revealed by the client, which are not capitalized upon by the Banker. The entire conversation lasts two-and-a-half minutes. You will not be allowed to pause or rewind Part 1. (If this is not your first attempt at this Module, you may skip it by clicking the skip Part 1 button.)

PART 2: Interactive Listening Section

At the end of Part 1, review your notes, and when ready click the GO! button to begin the interactive portion of this Module. You will hear the same conversation commence.

When you hear an error on the part of the Banker, click the STOP button immediately. The window of opportunity during which you can "score" by correctly clicking the STOP button is between 7 and 11 seconds. This window starts at the time the error occurs and ends near the end of the phrase or sentence. Do not wait until the end of a sentence to click the STOP button, as you may miss this window.

( BACK )     ( NEXT )

*FIG. 3D*

User Instructions

If you identify an error correctly:
The STOP button will change color from red to green, and the conversation will automatically pause at the end of the sentence. You will then be presented with a multiple-choice quiz.

If you click the STOP button when there is no error present:
The conversation will continue uninterrupted and the stop button will stay red. Wrong clicks will reflect in your final score, so do not click on this button indiscriminately.

If you fail to click the STOP button during an error:
The conversation will stop automatically, replay the error, and then present you with a multiple-choice quiz.

Quiz:
Each multiple-choice quiz contains 2 questions, which refer directly to the error they follow. You will get 2 chances to answer each question correctly, before being presented with the correct answer. Upon completion of each quiz, the conversation will resume.

BACK   NEXT

FIG. 3E

User Instructions

PART 3: Opportunity Identification Test.

After you have completed the last two-part multiple-choice quiz, you will be presented with an opportunity identification test. This test will contain 9 phrases, each presented individually. You will be required to identify statements made by the Client during the conversation, which revealed opportunities, but were missed by the banker. Correctly identify these statements by clicking directly on the phrase as soon as you identify an opportunity. Your window of opportunity to click on a phrase is very small, as each phrase stays on the screen for only a few seconds.

If you identify the phrase correctly, you will be presented with a single multiple-choice quiz, and the test will continue after you have answered it.

If you misidentify the phrase as an opportunity, the test will continue uninterrupted.

If you fail to identify an opportunit phrase, you will hear an automatic REPLAY of the phrase followed by the multiple-choice quiz.

( BACK )    ( NEXT )

FIG. 3F

Banker's Style Quiz:
To round off this module, you will be presented with a single question relating to your perception of the Banker's attitude and communication style.

Part 4: Final Score:
At the end of this module, you will be presented with a detailed score of this session, along with a scoring explanation.

Part 4: Final Score:
Click the GO TO PART 1 button to listen to the uninterrupted dialog. We encourage you to take notes during this section.

BACK          GO TO PART 1

*FIG. 3G*

Part 1 Reminder

PART 1:

You are about to hear the conversation in its entirety without interruptions. Make sure that you have a pen and paper ready to take ntoes. Listen carefully for errors made by the Banker. Also listen and take note of opportunities revealed by the Client, which are not capitalized on by the Banker.

As a reminder, this conversation picks up right after the Banker has opened up a new Checking account for the Client, who is new to the Bank. The Client has revealed to the Banker that he has an appointment at a car dealership after this meeting at the bank. The total length of the conversation is about two and a half minutes.

Do not click the SKIP Part 1 button on the next screen if you are attempting this Module for the first time.

Click the OK button when you are ready.

BACK    OK

FIG. 3H

Part 2

PART 2:

You are about to start the core interactive section of this Module.
Review your notes from Part 1, and have them on hand as a reminder.

Remember to stay very attentive and focused. Listen intently, with
your hand poised on the mouse, and the cursor positioned over the
STOP button. Be ready to click immediately when you hear an error.

The multiple-choice quizzes are not timed, so there is no need to rush
your answers. Click the TRY AGAIN button if you get the answer
wrong the first time.

Click the GO button below to proceed.

Good Luck!

Quiz 1 Question 1

Q. What is the error?

A. The Banker does not state the benefit to Mr. Jenkins for taking the time to do the Customer Service Review.

B. The Banker makes the Customer Service Review sound ordinary.

C. The Banker does not pre-position the Client Service Review at all.

Quiz 1 Question 1

Sorry, that's not the right answer.

Try Again!

TRY AGAIN

FIG. 3M

Quiz 1 Question 1

Incorrect
The correct answer is

A. The Banker does not state the benefit to Mr. Jenkins for taking the time to do the Customer Service Review.

B. The Banker makes the Customer Service Review sound ordinary.

C. The Banker does not pre-position the Client Service Review at all.

Quiz 1 Question 2

Correct

A. The fact that doing the Client Service Review is part of the banker's responsibility.

B. The fact that the Bank does this only with customers who maintain a minimum balance.

C. The fact that the Bank does the Client Service Review to provide appropriate financial recommendations.

D. All of the above

PART 3: Opportunity Identification Test

This test will contain 9 phrases, each presented individually. You will be required to identify statements made by the Client during the conversation, which revealed opportunites, but were missed by the banker. Correctly identify these statements by clicking directly on the phrase as soon as you identify an opportunity. Your window of opportunity to click on a phrase is very small, as each phrase stays on the screen for only a few seconds.

If you identify the phrase correctly, you will be presented with a single multiple-choice quiz, and the test will continue after you have answered it.

If you misidentify the phrase as an opportunity, the test will continue uninterrupted.

If you fail to identify an opportunity phrase, you will hear an automatic REPLAY of the phrase followed by the multiple-choice quiz.

Banker's Style Quiz:
To round off this module, you will be presented with a single question relating to your perception of the Banker's attitude and communication style.

Opportunities

What specific statements were made by the Client that the Banker did not capitalize upon during the conversation?

1. "A higher rate of return"

FIG. 3Q

You have just failed to identify an Opportunity!

To proceed with the session, please click the CONTINUE button below and you will be presented with the quiz.

Opportunity Question 1

Q. Why is this an opportunity?

A. If the client hasn't already moved from Texas, he may be moving soon which indicates a possibility for a home loan.

B. There may be real estate that has been sold or will be sold which indicates a possible windfall.

C. It can imply a recent marriage or divorce.

D. A & B only

FIG. 3S

Opportunity Question 1

Sorry, that's not the right answer.
Try Again!

TRY AGAIN

FIG. 3T

Opportunity Question 1

Incorrect
The correct answer is

A. If the client hasn't already moved from Texas, he may be moving soon which indicates a possibility for a home loan.

B. There may be real estate that has been sold or will be sold which indicates a possible windfall.

C. It can imply a recent marriage or divorce.

D. A & B only ( CONTINUE )

*FIG. 3U*

Banker Style Question
Q. How would you best describe the Banker's attitude and style?

A. Comforting & Formal

B. Discouraging & Informal

C. Unmotivated & Reactive

D. Patronizing & Abrupt

FIG. 3V

Banker Style Question

Correct

A. Comforting & Formal

B. Discouraging & Informal

C. Unmotivated & Reactive

D. Patronizing & Abrupt

Subjectivity

Naturally with respect to both errors and opportunities and their associated quizzes there could be some subjectivity.

We believe that all errors and opportunities that are built into the scenarious are objectively correct.

On the other hand, as participant, you may have found additional errors and opportunities that ALT did not identify. Likewise, there may be a difference of opinion on some of the multiple-choice questions and answers.

Not withstanding the above, we have reviewed all ALT choices with a team of experts, and believe they are the best possible choices.

As the object of ALT is continuous improvement the score you are about to receive is not a "grade score". We believe that any difference of opinion between your thoughts and those of ALT will be relatively minor and inconsequential.

( GO TO SCORE )

*FIG. 3X*

LISTENING SCORE

Correct STOPS:
(Number of correctly identified errors)

Incorrect STOPS:
(Number of times you asked STOP when no error was present)

MULTIPLE-CHOICE QUIZ SCORE

Correct Answers:
(Questions you answered correctly on the first or second attempt)

OPPORTUNITIES SCORE

Correct STOPS during Opportunity Test
(Number of correctly identified opportunites)

Incorrect STOPS during Opportunity Test
(Number of times you clicked STOP when no Opportunity was present)

Correct Opportunity Quiz Answer:
(Questions you answered correctly on the first or second attempt)

STYLE ANSWER:

( CLOSE WINDOW )  ( REPEAT ALT )

FIG. 3Y

ADVANCED LISTENING
TECHNOLOGIES (ALT) TRAINING
SYSTEMS CONTAINS SEVERAL
LEARNING APPROACHES.

IN THIS TUTORIAL YOU WILL LEARN
HOW TO NAVIGATE THROUGH ONE
OF THE ALT TRAINING SYSTEM
FORMATS

◁ GO BACK?
▯ PAUSE

ADVANCED LISTENING TECHNOLOGIES TRAVEL
AGENCY — INSTRUCTIONS:

YOU ARE ABOUT TO HEAR A CONVERSATION
BETWEEN A TRAVEL AGENT AND A CUSTOMER.
CERTAIN STATEMENTS MADE BY THE TRAVEL
AGENT CONTAIN FACTUAL ERRORS.

YOU WILL HAVE 5 SECONDS AFTER THE ERROR
OCCURS TO CLICK THE RED STOP BUTTON AND
CORRECTLY IDENTIFY THE PRESENCE OF AN ERROR.
FOR EACH ERROR CONTAINING SEGMENT CORRECTLY
IDENTIFIED YOU WILL BE PRESENTED WITH AN
INTERACTIVE QUIZ. UPON COMPLETING EACH QUIZ,
THE CONVERSATION WILL RESUME.

NOTE: INCORRECT CLICKS ON THE ERROR BUTTON
WILL BE REFLECTED IN YOUR FINAL SCORE.

CLICK THE START BUTTON BELOW TO BEGIN.

GOOD LUCK!

IN THE BEGINNING OF EACH
ALT MODULE, YOU WILL
RECEIVE INSTRUCTIONS.
SIMPLY GLANCE AT THIS
AS IT IS MERELY AN
EXAMPLE OF WHAT YOU
MIGHT EXPECT TO SEE.

◁ GO BACK?
▯ PAUSE

*FIG. 5B*

IN EACH MODULE THERE WILL BE A VARIED COLLECTION OF CHARACTERS PARTICIPATING IN A CONVERSATION ASSOCIATED WITH YOUR FIELD. IN THIS MODULE, THERE ARE TWO CHARACTERS. THE SCENARIO TAKES PLACE IN A TRAVEL AGENCY.

◁GO BACK?
▯PAUSE

THIS PARTICULAR ALT LEARNING
APPROACH FOCUSES ON
ERROR IDENTIFICATION.

WITHIN THIS CONVERSATION
ERRORS ARE STRATEGICALLY
PLACED. IT IS YOUR JOB TO
FIND THEM.

◁GO BACK?
◐PAUSE

IN SOME MODULES, YOU WILL BE GIVEN A CHANCE TO LISTEN TO THE ENTIRE CONVERSATION UNINTERRUPTED, DURING WHICH YOU CAN TAKE NOTES PRIOR TO THE INTERACTIVE PORTION.

IN OTHER MODULES YOU WILL NOT BE GIVEN THIS CHANCE.

◁GO BACK?
▯PAUSE

IN THE INTERACTIVE PORTION OF THIS MODULE, YOU WILL BE EXPECTED TO ENGAGE WITH THE CONVERSATION.
YOU CAN CLICK ANYWHERE WITHIN THIS AREA TO IDENTIFY THE ERROR WHEN YOU HEAR IT.

◁GO BACK?
⏸ PAUSE

WHEN YOU CLICK THE MOUSE AT THE APPROPRIATE TIME, THE ERROR BUTTON WILL TURN GREEN.

◁GO BACK?
❙PAUSE

HOWEVER, IF YOU CLICK THE MOUSE WHEN THERE IS NO ERROR IN THE CONVERSATION, THE ERROR BUTTON WILL TURN RED AND READ INCORRECT. EVEN WHEN YOU CLICK THE MOUSE INCORRECTLY, THE NUMBER OF WRONG CLICKS IS RECORDED IN YOUR FINAL SCORE. SO MAKE SURE YOU ONLY CLICK IT WHEN YOU THINK THERE IS AN ERROR.

◁ GO BACK?
▯ PAUSE

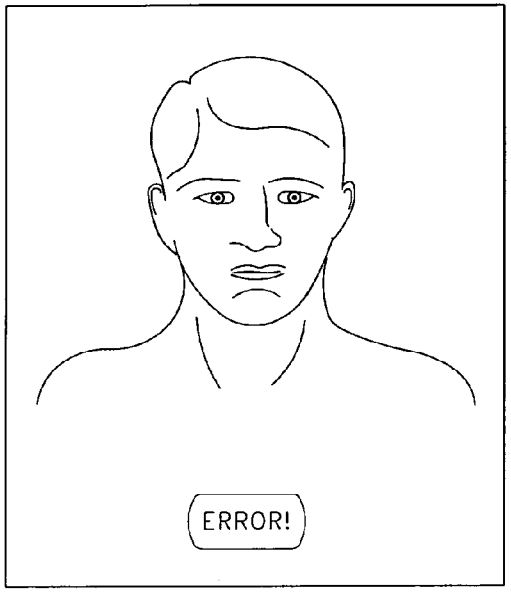

THE TIME ALOTTED FOR EACH ERROR IS 5 SECONDS FROM THE TIME THE TRAVEL AGENT MAKES A WRONG STATEMENT.

FOR THE PURPOSE OF THIS TUTORIAL, THE ERROR WILL BE REVEALED TO YOU AND THE COUNTDOWN WILL BE SHOWN ON A CLOCK. HOWEVER, THIS WILL NOT BE THE CASE IN THE ACTUAL MODULES.

AS AN EXAMPLE, AN ERROR WILL OCCUR WHERE THE TRAVEL AGENT STATES THAT INGRID BERGMAN'S BIRTHPLACE IS IN FINLAND.

HERE THE ERROR WILL BE IDENTIFIED CORRECTLY WITHIN THE TIME ALOTED.

◁GO BACK?
▯PAUSE

*FIG. 51*

◁GO BACK?
◍PAUSE

SEE HOW FAST IT GOES BY?

IN THIS TUTORIAL, THERE WILL BE 2 MULTIPLE-CHOICE QUIZZES PER ERROR. THE FIRST QUIZ WILL ASK YOU ABOUT THE NATURE OF THE SPECIFIC ERROR. THE SECOND QUIZ WILL ASK YOU TO IDENTIFY THE CORRECT ALTERNATIVE.

◁GO BACK?
❚ PAUSE

QUIZ 1A

WHAT IS THE ERROR?

A. INGRID BERGMAN WAS BORN IN FINLAND.

B. THE WEATHER IN FINLAND IS STUNNING DURING THE SUMMER MONTHS.

C. INGRID BERGMAN IS A FICTIONAL CHARACTER WHO NEVER EXISTED IN REAL LIFE.

D. A & B

HERE IS THE FIRST QUIZ WHERE YOU WOULD PICK THE ANSWER THAT BEST FITS THE QUESTION USING YOUR MOUSE TO SELECT THE CORRECT ANSWER.

NOW, WE'LL DO IT FOR YOU.

◁GO BACK?
◫PAUSE

*FIG. 5L*

QUIZ 1A

WHAT IS THE ERROR?

A. INGRID BERGMAN WAS BORN IN FINLAND.

B. THE WEATHER IN FINLAND IS STUNNING DURING THE SUMMER MONTHS.

C. INGRID BERGMAN IS A FICTIONAL CHARACTER WHO NEVER EXISTED IN REAL LIFE.

D. A & B

◁GO BACK?
▊PAUSE

QUIZ 1B

WHAT SHOULD THE TRAVEL AGENT
HAVE SAID INSTEAD?

A.  INGRID BERGMAN WAS BORN IN NORWAY.

B.  INGRID BERGMAN WAS BORN IN DENMARK.

C.  INGRID BERGMAN WAS BORN IN SWEDEN.

D.  TO THIS DAY, THE BIRTHPLACE OF INGRID
    BERGMAN REMAINS A MYSTERY.

◁GO BACK?
◫PAUSE

*FIG. 5N*

QUIZ 1B

WHAT SHOULD THE TRAVEL AGENT
HAVE SAID INSTEAD?

A. INGRID BERGMAN WAS BORN IN NORWAY.

B. INGRID BERGMAN WAS BORN IN DENMARK.

C. INGRID BERGMAN WAS BORN IN SWEDEN.

D. TO THIS DAY, THE BIRTHPLACE OF INGRID
   BERGMAN REMAINS A MYSTERY.

◁GO BACK?
◧PAUSE

QUIZ 1B

SORRY! THE ANSWER IS C.

A. INGRID BERGMAN WAS BORN IN NORWAY.

B. INGRID BERGMAN WAS BORN IN DENMARK.

C.  INGRID BERGMAN WAS BORN IN SWEDEN.

D. TO THIS DAY, THE BIRTHPLACE OF INGRID BERGMAN REMAINS A MYSTERY.

CONTINUE CONVERSATION ⊙

IF YOU PICK THE WRONG OPTION A SECOND TIME THE CORRECT ANSWER WILL BE AUTOMATICALLY HIGHLIGHTED AS SHOWN.

YOU MAY THEN CONTINUE ON WITH THE CONVERSATION BY CLICKING THE ARROW.

◁GO BACK?
❚PAUSE

*FIG.5P*

QUIZ 1B

SORRY! THE ANSWER IS C.

A. INGRID BERGMAN WAS BORN IN NORWAY.

B. INGRID BERGMAN WAS BORN IN DENMARK.

C. INGRID BERGMAN WAS BORN IN SWEDEN.

D. TO THIS DAY, THE BIRTHPLACE OF INGRID BERGMAN REMAINS A MYSTERY.

CONTINUE CONVERSATION 

IF YOU PICK THE WRONG OPTION A SECOND TIME THE CORRECT ANSWER WILL BE AUTOMATICALLY HIGHLIGHTED AS SHOWN.

YOU MAY THEN CONTINUE ON WITH THE CONVERSATION BY CLICKING THE ARROW.

◁ GO BACK?
❚❚ PAUSE

*FIG.5Q*

INCORRECT...
    TRY AGAIN.

IF YOU PICK THE WRONG
OPTION YOU WILL HAVE A
SECOND CHANCE TO
IDENTIFY THE
CORRECT ANSWER.

◁GO BACK?
❚PAUSE

*FIG. 5R*

THE CONVERSATION WOULD THEN CONTINUE WHERE IT LEFT OFF. IDENTIFY THE CORRECT ANSWER.

◁GO BACK?
⏸PAUSE

SCORE

CORRECTLY IDENTIFIED
ERRORS:                    4 OUT OF 4

INCORRECT CLICKS ON
THE ERROR BUTTON:                    4

MULTIPLE-CHOICE QUIZ SCORE

CORRECTLY ANSWERED
QUIZZES:                   3 OUT OF 8

AT THE END OF EACH ALT MODULE, THERE IS A SCORE PAGE WHICH OUTLINES HOW YOU DID WHILE GOING THROUGH THE CONVERSATION.

◁GO BACK?
▯PAUSE

*FIG.5T*

NOW, YOU HAVE A BETTER IDEA OF
HOW THE ALT PROCESS WORKS,
WITH RESPECT TO IDENTIFYING
ERRORS AND COMPLETING MULTIPLE
CHOICE QUIZZES.

THE MODULE YOU WILL NOW
PARTICIPATE IN IS FOR PRACTICE
PURPOSES ONLY. EVEN IF YOU KNOW
ALL OF THE ANSWERS, WE ENCOURAGE
YOU TO MAKE INTENTIONAL ERRORS
SO THAT YOU CAN FAMILIARIZE
YOURSELF WITH THE PROCESS.

REMEMBER, KEEP YOUR FINGERS POISED
ON THE MOUSE TO IDENTIFY THE
ERRORS AS SOON AS YOU HEAR THEM.

TRY FINDING ALL 4 ERRORS IN THE ALT
TRAVEL AGENT MODULE ⊙

◁ GO BACK?
◧ PAUSE

*FIG. 5U*

YOU HAVE MISSED AN ERROR.

THE ERROR WILL NOW REPLAY
FOR YOU TO HEAR.

THEN THE QUIZZES FOLLOW.

◁GO BACK?
⏸PAUSE

*FIG.5V*

SYSTEMS AND METHODS FOR COMPUTERIZED INTERACTIVE TRAINING

PRIORITY APPLICATION

This application is a continuation of U.S. patent application Ser. No. 11/340,891, filed Jan. 27, 2006, which claims the benefit under 35 U.S.C. 119(e) of U.S. Provisional Patent Application 60/647,983, filed Jan. 28, 2005, U.S. Provisional Patent Application 60/692,093, filed Jun. 20, 2005, and U.S. Provisional Patent Application, 60/731,994, filed Nov. 1, 2005. The entire disclosure in the priority applications is hereby incorporated by reference herein in its entirety.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention is directed to interactive training, and in particular, to methods and systems for computerized interactive training.

2. Description of the Related Art

In order to teach employees and others new skills, training systems have been developed. However, many conventional training systems are based on the premise that the most efficient way to train people is to have them observe or listen to a presentation of example scenarios of the correct way to perform a task. For example, the presentation can include a presentation of the correct way for a customer service representative to interact with a customer.

Disadvantageously, many of these conventional techniques fail to provide adequate training reinforcement and often fail to adequately engage the trainee. Further, many conventional training techniques fail to provide an adequate method of measuring a trainee's skill acquisition.

In addition, certain conventional training techniques necessitate an undesirable amount of manual interaction by a human trainer, thereby increasing training costs. Still further, certain conventional training techniques do not provide an adequate mechanism for measuring a trainee's progress.

SUMMARY OF THE INVENTION

The present invention is directed to interactive training, and in particular, to methods and systems for computerized interactive training and learning. For example, certain embodiments can be used to teach people to enhance their performance with respect to a variety of skills.

In an example embodiment, a user is provided with the ability to intervene and stop a pre-recorded scenario involving one or more real or simulated human (e.g., an animation) actors to identify an error (e.g., a verbal error) by an actor in handling the situation being presented and/or an opportunity presented in the scenario. The user is scored based on the correctness of the user's identification of the error and/or opportunity and/or analysis of the error and/or opportunity. Thus, the user is trained to better identify opportunities and avoid errors.

By way of illustration, certain embodiments can be utilized in the business field to teach trainees to sell or market services or products via a variety of delivery channels to a variety of different types of prospects, such as customers. By way of further example, certain embodiments can train people to coach other people with respect to the acquisition of certain skills (e.g., listening skills) Further, certain embodiments can be utilized to teach management to better communicate with and lead lower level personnel.

In addition, certain embodiments can be utilized with respect to people's personal life to teach families interaction skills For example, certain embodiments can be utilized to train parents parenting techniques, and to teach spouses, significant others, siblings, children, and other relatives and/or friends relationship and interpersonal skills One embodiment utilizes a computerized system to enhance a trainee's listening comprehension as part of the training process. For example, the training can be delivered via a stand alone personal or other computer. The training program may be loaded into the personal computer via a computer readable medium, such as a CD ROM, DVD, magnetic media, solid state memory, or otherwise, or downloaded over a network to the personal computer. By way of further example, the training program can be hosted on a server and interact with the user over a network, such as the Internet or a private network, via a client computer system or other terminal. For example, the client system can be a personal computer, a computer terminal, a networked television, a personal digital assistant, a wireless phone, an interactive audio player, or other entertainment system. A browser or other user interface on the client system can be utilized to access the server, present training media and to receive user inputs.

One example embodiment provides a method of training a user via error spotting using an interactive electronic training system, the method comprising: causing a first training presentation of a first interaction of at least two people to be presented on a user terminal, wherein the user is not asked to identify interaction errors during the first presentation; causing a second training presentation of the first interaction to be presented on the user terminal, and instructing the user to identify at least one interaction error event; determining if the user identified an occurrence of a first interaction error event within a first window period; providing the user with positive feedback if the user identified the occurrence of the first interaction error within the first window period; if the user did not identify the occurrence of the first interaction error event within the first window period, automatically replaying at least a portion of the first interaction, wherein the portion of the first interaction includes at least the first interaction error event; pausing the second training presentation and presenting at least a first quiz to the user, the first quiz related to the first interaction error; receiving the user's response to the first quiz; presenting a second quiz to the user, wherein the user is to identify a statement or phrase spoken by a first individual during the first interaction, which represented opportunities that were missed by a second individual in the first interaction; receiving the user's response to the second quiz; and scoring the user's performance based at least in part on the user's first quiz response and the user's second quiz response.

Another example embodiments includes an electronic training system, the electronic training system comprising: a training module database stored in computer readable memory, including at least a first training module, wherein the first training module includes a simulation of an interaction between at least two individuals, the simulation having associated metadata that indicates events within the simulation to be user identified, and at least a first related test; a program stored in computer readable memory, configured to: cause the simulation to be presented to a user via a user terminal; determine if the user identified a first of the events within a first predetermined window of time; provide a first score if the user identified the first event within the first predetermined window of time, and store the first score in computer readable memory; cause a portion of the simulation to be presented again if the user did not identify the first event within the first predetermined window of time; cause the first related test to be presented to the user, wherein the first related test is related to the first event; receive a user answer to the first related test; provide a second score based on the user answer, and store the second score in computer readable memory; and present at least one score to the user.

Still another example embodiment provides a method of training a user via an interactive electronic training system, the method comprising: providing via a user terminal a first training presentation of a first interaction between real or simulated people; providing user instructions which instruct the user to identify at least a first type of interaction event; determining if the user identified an occurrence of a first interaction event of the first type within a first window of time; providing the user with positive feedback if the user identified the occurrence of the first interaction event within the first window of time; if the user did not identify the occurrence of the first interaction event within the first window of time, automatically replaying at least the first interaction event; pausing the first training presentation and presenting a first quiz to the user, the first quiz related to the first interaction event; receiving the user's response to the first quiz; and resuming the first training presentation.

Yet another example embodiment provides a method of training a user via an interactive electronic training system, the method comprising: providing via a user terminal a first training presentation of a first interaction between real or simulated people, wherein the interaction is between a customer and a customer service person or a first family member and a second family member; automatically causing the presentation of the first interaction to be paused at a predetermined point in the first interaction; and causing a test related to the first interaction to be provided to the user while the first interaction is paused; resuming the presentation of the first interaction at least partly in response to the user providing a test response and/or an elapse of a first amount of time; and scoring the user response, and providing the user with scoring related information.

One embodiment provides a method of training a user via an interactive electronic training system, the method comprising: providing via a user terminal a first training presentation of a scenario including at least a first individual giving a speech, a monologue, or one side of a conversation; providing user instructions which instruct the user to identify at least a first type of event relating to the speech, monologue or one side of a conversation; determining if the user identified an occurrence of a first interaction event of the first type within a first window of time; providing the user with positive feedback if the user identified the occurrence of the first interaction event within the first window of time; if the user did not identify the occurrence of the first interaction event within the first window of time, automatically replaying at least the first interaction event; pausing the first training presentation and presenting a first quiz to the user, the first quiz related to the first interaction event; receiving the user's response to the first quiz; and resuming the first training presentation.

Another embodiment provides a method of training a user via an interactive electronic training system, the method comprising: providing via a user terminal a first training presentation of a first interaction between real or simulated people; providing a user instruction which instructs the user to identify at least a first type of interaction event; determining if the user appropriately identified an occurrence of a first interaction event of the first type; if the user appropriately identified the occurrence of the first interaction event, notifying a second user; providing the second user with a question related to the first interaction even and a corresponding answer, wherein the second user is to verbally ask the first user the question; and generating a score based at least in part on an answer by the first user to the question.

Still another embodiment provides a method of training a user via an interactive electronic training system, the method comprising: providing to a plurality of users at substantially the same time, via a plurality of terminals, a first training presentation of a scenario including an interaction between at least two individuals; providing user instructions which instruct the users to identify at least a first type of event relating to the interaction; determining which of the users first identified an occurrence of a first event of the first type; and providing the user which first identified the occurrence of the first event with a relatively higher score than other users with respect to the first event.

Yet another embodiment provides a method of training a user via an interactive electronic training system, the method comprising: providing via a user terminal a first training presentation of a scenario including at least a first individual speaking; providing user instructions which instruct the user to: identify at least a first type of event relating to the content of the first individual's speech; indicate when the user has a thought unrelated to the first training presentation; determining if the user identified an occurrence of a first interaction event of the first type within a first window of time; pausing the first training presentation and presenting a first quiz to the user, the first quiz related to the first interaction event; receiving the user's response to the first quiz; and resuming the first training presentation.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

DETAILED DESCRIPTION OF PREFERRED EMBODIMENTS

Figure 1:
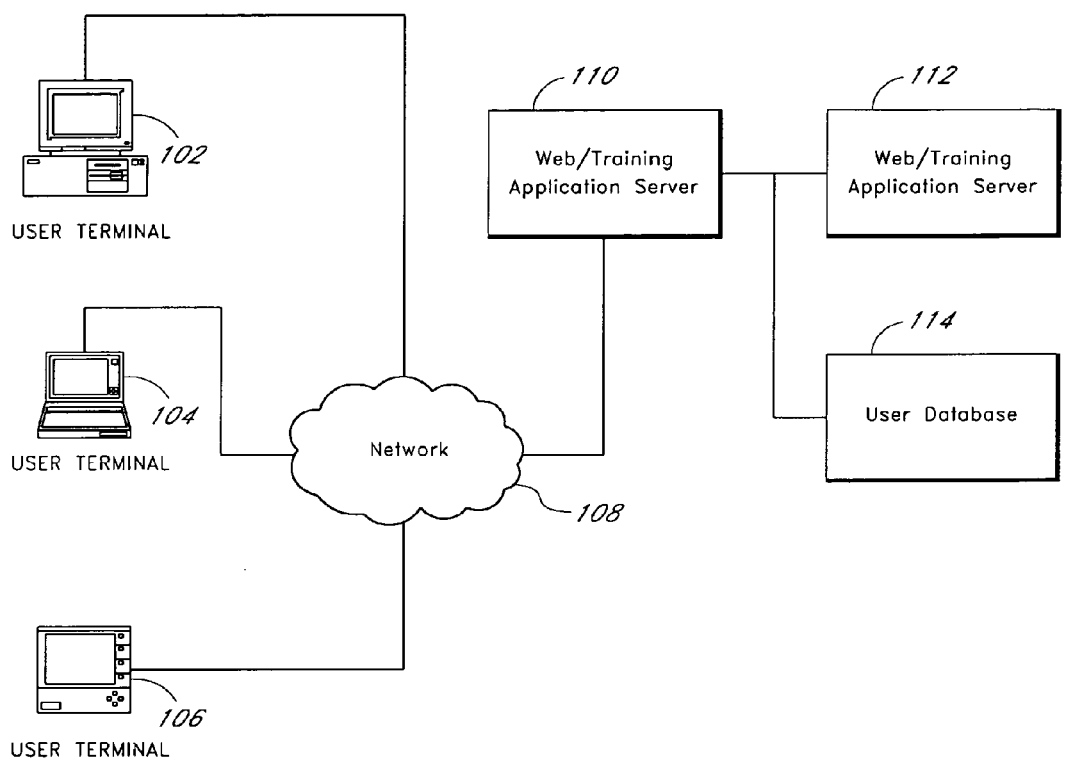
FIG. 1 illustrates an example networked system that can be used with the training system described herein.

The present invention is related to interactive training, wherein users are trained to identify errors and/or opportunities. For example, certain embodiments can be used to teach people to enhance their performance with respect to a variety of skills by enhancing their learning comprehension.

The inability to listen hinders good communication, thereby causing personal or business relationships to falter and often causing missed opportunities (e.g., converting prospects into customers). Certain embodiments enhance the listening effectiveness of people in personal, human relationships and interactions. For example, certain embodiments teach customer service personnel how to listen with comprehension and what to listen for when dealing with customers, including tones, styles, and interpretations of customer communications.

As described herein, different animated, situation specific role-playing simulation modules are used to train trainees (e.g., managers, employees, teachers, doctors, lawyers, travel agents, bankers, spouses, children, actors, singers, etc.) to improve their listening comprehension and/or their ability to respond effectively. For example, a sales and service module may include an "employee" who makes "real life" errors and misses opportunities while interacting with a prospect or customer. By way of further example, a management/coaching module may include a manager/coach who makes "real life" errors in managing and coaching subordinate employees, and who misses opportunities in interacting with one or more of her or his subordinate employees. For example, a module may provide a presentation of a banker interacting with a client. Once the client leaves, a manager or other coach provides suggestions, criticisms, and/or identifies errors to the banker. The trainee then needs to identify errors, missed opportunities, and/or poor word choices with respect to the coach in the module. In one embodiment of a training system, the user is instructed to identify the errors and opportunities embedded throughout the module's role-play simulation. Thus, a variety of real world situations can be presented via one or more modules, preferably with sufficient interactivity so as to engage the user's interest and reduce or eliminate training boredom.

By interactively discovering errors and opportunities, optionally at the rate of speed of the real world, users will be able to learn what errors they are personally making and how they sound, how to correct them, and/or how to identify opportunities and how to capitalize on opportunities. This element of acting in real-time enhances the quality of learning, the speed of learning, and learning engagement. Certain embodiments also teach users how to listen carefully and focus on what is being communicated to them. The presented "real life" situations, and the optional interactivity required from users, train users to actively listen.

In an optional embodiment, when a user does not react to the error or opportunity (e.g., by activating a control indicating that an error or opportunity has been heard/identified), the role-play simulation automatically stops. Then the module portion containing the error or opportunity is repeated so that the user can hear/see the previously missed error or opportunity, and a quiz is presented to the user. The quiz for example, optionally asks about the nature of a given error or opportunity, and appropriate actions that should have been taken. In addition, the user is optionally "held accountable" for identifying opportunities and indicating how to capitalize on the presented opportunities. In an example embodiment, users learn the correct actions to take for a variety of situations via a variety of appropriate role-simulation modules. At the end of a module, the user's score is optionally displayed so the user can monitor his or her progress. Because the modules optionally provide substantially instantaneous and automatic feedback, rapid quality learning and engagement are achieved.

In order to enhance trainees' ability to better understand the impact and/or meaning of certain voice tones, and to enable them to better "read between the lines," a module can test the trainee on what the trainee has heard.

By way of further example, certain modules optionally include role-plays that contain phrases where the ability of "reading between the lines" and understanding "what is meant" is needed to correctly answer certain quizzes. Users may listen to the role-play, in which characters make self-revealing statements. That is, statements that reveal something about themselves (e.g., something that may be related to potential financial needs). Optionally, role playing characters will make statements that verbalize something different then what they may actually feel or think, wherein the statements may nonetheless provide a hint or indication as to what the character is thinking, and the user will be tested on their ability to hear and analyze the foregoing. Optionally, users may need to first identify subtle phrases and then participate in a multiple-choice quiz where they are asked to reach the proper conclusions about what is "going on between the lines" and "what is meant". Users may then be asked regarding appropriate next steps and how to capitalize on "hidden opportunities". Users may be tested on their ability to identify and recall significant phrases spoken during the training session.

By way of illustration, certain embodiments can be utilized in the business field to teach trainees to sell or market services or products via a variety of delivery channels to a variety of different types of prospects, such as customers. By way of further illustration, certain embodiments can train people to coach other people with respect to the acquisition of certain skills Further, certain embodiments can be utilized to teach management to better communicate with and lead lower level personnel.

In addition, certain embodiments can be utilized in people's personal life to teach families interaction skills For example, certain embodiments can be utilized to train parents parenting techniques, and to teach spouses, significant others, siblings, children, and other relatives and/or friends relationship and interpersonal skills Certain embodiments can be used to teach public speaking and/or listening to public speakers.

Thus, the methods and processes described herein enable users to improve their listening skills to better hear and comprehend what others (e.g., customers, clients, or prospects) are saying. Additionally, using systems and methods described herein, users can be trained to spot subtle and unintentional clues provided by customers, clients, and prospects.

Further, using systems and methods described herein, users can be trained to better identify and capitalize opportunities presented in dealings with others. Still further, using systems and methods described herein, users can be trained to better identify how to identify and correct errors/incorrect statements and/or questions in interactions with others. Users can be trained to better analyze the needs of customers, clients, and prospects. Further, the systems and processes described herein can train users in how to better recommend services or products to customers, and to overcome customer objections to taking advantage of such services or products. Thus, users are optionally trained in how to better negotiate, manage sales and how to better close sales. Users can optionally be trained to improve their presentation skills, as well as the style and content of their conversations.

Example embodiments will now be described in greater detail. Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networks of interactive televisions or of telephones, and other protocols may be used as well.

In addition, unless otherwise indicated, the functions described herein are preferably performed by executable code and instructions stored in computer readable memory and running on one or more general-purpose computers. However, the present invention can also be implemented using special purpose computers, other processor based systems, state machines, and/or hardwired electronic circuits. Further, with respect to the example processes described herein, not all the process states need to be reached, nor do the states have to be performed in the illustrated order. Further, certain process states that are described as being serially performed can be performed in parallel.

Similarly, while the following examples may refer to a user's personal computer system or terminal, other terminals, including other computer or electronic systems, can be used as well, such as, without limitation, an interactive television, a networked-enabled personal digital assistant (PDA), other IP (Internet Protocol) device, a cellular telephone or other wireless terminal, a networked game console, a networked MP3 or other audio device, a networked entertainment device, and so on.

Further, while the following description may refer to a user pressing or clicking a key, button, or mouse to provide a user input or response, the user input can also be provided using other apparatus and techniques, such as, without limitation, voice input, touch screen input, light pen input, touch pad input, and so on. Similarly, while the following description may refer to certain messages or questions being presented visually to a user via a computer screen, the messages or questions can be provided using other techniques, such as via audible or spoken prompts.

One example embodiment utilizes a computerized training system to enhance a trainee's listening comprehension. For example, the training can be delivered via a terminal, such as a stand-alone personal computer. The training program may be loaded into the personal computer via a computer readable medium, such as a CD ROM, DVD, magnetic media, solid state memory, or otherwise, or downloaded over a network to the personal computer.

By way of further example, the training program can be hosted on a server and interact with the user over a network, such as the Internet or a private network, via a client computer system or other terminal. For example, the client system can be a personal computer, a computer terminal, a networked television, a personal digital assistant, a wireless phone, an interactive audio player, or other entertainment system. A browser or other user interface on the client system can be utilized to access the server, to present training media, and to receive user inputs.

As will be described in greater detail below, in one embodiment, a training system presents a scenario to a user via a terminal, such as a personal computer or interactive television. The scenario can be a pre-recorded audio and/or video scenario including one or more segments. The scenario can involve a single actor or multiple actors (e.g., a human actor or an animated character) reading a script relevant to the field and skill being trained. For example, the actors may be simulating an interaction between a bank teller or loan officer and a customer. The simulated interaction can instead be for in-person and phone sales or communications. By way of further example, the actors may be simulating an interaction between a parent and a child. By way of further example, a single actor, such as one representing a public speaker (e.g., someone giving a monologue or speech to a live audience and/or an audience that will see and/or hear a recording of the speech, or someone providing one side of a conversation) can be represented. Optionally, rather than using actors to read a script, the pre-recorded scenario can involve a real-life unscripted interaction.

The user is provided with the ability to intervene and stop the pre-recorded scenario to identify an error by an actor in handling the presented situation and/or an opportunity presented in the scenario. For example, the user can intervene and stop the scenario by pressing a key, giving a voice command or otherwise.

In an example embodiment, embedded or otherwise associated with the audio track and/or video track is digital metadata that identifies where an error or opportunity occurs in the track, what the error or opportunity is, questions for the user (such as multiple choice, true/false, or questions needing textual responses, such as free form questions) regarding the error or opportunity, and the correct answers to the questions.

The user is asked to identify the error made by an actor and/or opportunity, such as an opportunity missed by an actor. The error may be an error in the choice of words. Once the user has intervened, the user is optionally presented with a multiple choice textual list of errors, other wording choices, and/or opportunities from which the user is to select the error, other wording choices, and/or opportunity presented directly before the user intervened. By way of example and not limitation, the list can be presented via a drop-down menu or screen, a pop-up window, or otherwise. Optionally, rather than a multiple choice selection, the user may be presented with a true/false choice. The user can also be presented with an on-screen field in which the user types in or otherwise enters what the user thinks is the opportunity/error. Optionally, once the user identifies the opportunity using one or more of the foregoing techniques, or using a different technique, the system can automatically present to the user the actual or correct pre-programmed opportunities/errors. Optionally, if a public speaker is being presented in a training session, the user can be asked to identify statements that are compelling, that sound trustworthy, that sound untrustworthy, that are annoying, etc., by clicking on a button, a corresponding quiz answer, or otherwise.

This training process thus provides users with an interactive discovery and learning process that helps users identify errors during training so that they may avoid such errors in their own interactions. Further, the example process provides users with an interactive discovery and learning process that helps users identify opportunities during training so that they may identify and take advantage of similar opportunities and avoid errors in their own interactions with others.

Optionally, the user may be provided with a time-limited window after the error or opportunity is presented to intervene and/or identify the occurrence of the error or opportunity. The use of such time response windows is very motivational because users have to interact within the relatively short time windows, thereby better ensuring user attentiveness and engagement. For example, the window can be a two second window, a five second window, or other window duration.

Optionally, different time periods can be used for different errors and/or opportunities. Further, a short time period or longer time period can be used for different users. For example, more advanced users/trainees can be provided with a relatively shorter period of time in which to respond than relatively less advanced users/trainees. Optionally, the size of the time window can be selected by a training administrator. Optionally, the size of the time window can be selected by the user being trained. Optionally, the size of the window can automatically be adjusted by the training system software based on the user's previous responses.

The system can store and/or score a user based on the number of the user's correct and incorrect interventions of the pre-recorded scenario. In addition, the score can optionally be based in part on the presumed difficulty of identifying a given error or opportunity and/or how quickly the user correctly identified the error or opportunity. Optionally, if the user identified an error or opportunity where none existed, the user's score can be decremented by assigning negative points or other decrementing score to the incorrect identification.

Optionally, group training is provided by the training system in a competitive manner, further engaging users' attentiveness. For example, multiple users can view a given scenario or corresponding user terminals at substantially the same time. The users can compete, wherein the first user that correctly identifies a given error and/or opportunity wins or is awarded a highest score with respect to identifying the given error and/or opportunity. Optionally, relatively lower scores can be provided to those users who later correctly identified the given error and/or opportunity, wherein higher scores are provided to those who more quickly identified the given error and/or opportunity. Optionally, a lowest possible or zero score is given to those who fail to intervene and/or to those that intervene outside of the predetermined window. Optionally, a negative score (a score that indicates an incorrect user indication) is assigned to those that intervened when no error and/or opportunity occurred. Optionally, users are not presented with the list of errors and/or opportunities at the time the users failed to make a correct identification.

At the completion of a group training session or sub-session, the scores can be totaled for each participating user and the scores can be presented to the users, optionally ranked in accordance with the scores.

Optionally, a given pre-recorded segment is not repeated the same day, or within a predetermined duration, to better ensure that a user is consistently challenged by different scenarios. Optionally, pre-recorded segments can be repeated periodically, and/or repeated in response to a user scoring below a predetermined threshold for a corresponding segment.

An example training process will now be described in greater detail. A user can launch and optionally log into a training system program. Optionally, during the log-in process a user identifier and/or password is provided to the training system so that the system can automatically select the appropriate training module for the user and store the user's interactions and/or score in a database in association with the user identifier.

Optionally, the system can present with a selection of modules, such as segments or training sequences and the user selects the desired segment or sequence. Optionally, a training administrator can select and specify the segments to be presented to the user. Optionally, the system automatically selects which segment is to be presented.

Before presenting the segment, text, audio, and/or video, instructions are presented to the user which explain to the user the purpose of the selected training module, the different interactive possibilities that exist within the selected training module, how the user is to interact with the training program, and scoring process.

The user then clicks on a "start" button (or takes other appropriate initiation action) and the training module's audio and/or video segment begins playing on the user's terminal. The video can include real or animated figures that articulate or appear to be "articulating" the pre-recorded audio track. For example, the simulation can be generated using Macromedia Flash or using other applications. The training segment can be two to five minutes in length, or other length. Within the pre-recorded audio track are pre-programmed opportunities and/or errors, which are identified using metadata not visible to the user at the time the corresponding opportunity or error is presented to the user.

When the user thinks he or she has identified an opportunity and/or error related to the skill being trained, the user presses an appropriate keyboard or mouse key (or otherwise provides an appropriate response) to so indicate. The training system determines whether the response was provided within a predetermined response time window (such as within 5 seconds of the occurrence).

If the user correctly identifies the occurrence of an opportunity/error within the prescribed time window, a variety of possible text messages are displayed on the screen. For example, the user can be presented with a multiple choice, true/false, or fill in the blank type question. The user then provides a response to the question to the system. For example, the multiple choice question may list a number of possible errors or opportunities, and the user needs to select the error or opportunity that actually occurred in the corresponding segment. After the user provides a response, the training system can then determine if the user response was correct or incorrect and assigns an appropriate score to the response. Substantially immediately after making the determination as to the correctness of the answer (and/or at a later time), the training system can optionally provide the user with the correct answer if the user's answer was incorrect, or, if the user's answer was correct, the training system can so inform the user. Optionally, the user may be given multiple chances to select the correct answer. For example, the user may be provided with two chances to select the right answer in a four choice multiple-choice test, and if the user selects the incorrect answer on both attempts, the system identifies the correct answer.

If the user does not take the appropriate action to identify the occurrence of an error or opportunity within the prescribed timeframe, and provides identification thereafter, optionally, the text messages for the opportunity or error are not presented to the user at this time, and the user's action is recorded as an error with respect to the scoring. Optionally, an indication can be immediately provided to the user via an icon, pop-up text message, tone, or otherwise, indicating that the user missed identifying the occurrence within the time window.

If the user does not take the appropriate action to identify the occurrence of an error or opportunity within the prescribed timeframe, the text messages for the opportunity or error are not presented to the user at this time, and the user's action is recorded as an error with respect to the scoring. Optionally, an indication can be immediately provided to the user via an icon, pop-up text message, tone, or otherwise, indicating that the user missed identifying the occurrence.

Optionally, once the right answer has been selected by the user, or after the correct answer has been automatically displayed as a result of the user failing to select the correct answer, another question, which can be in the form of a multiple-choice test, is displayed which, for example, can ask the user what would be the right way to capitalize on the opportunity or what would be the correct way to handle the situation as compared to the erroneous way a situation was handled in the pre-recorded scenario.

After the questioning or testing process for a given error or opportunity is complete, the scenario resumes. Optionally, the scenario can resume from the beginning of the just reviewed opportunity/error so that the balance of the scenario is in context.

Optionally, if the user failed to identify the error and/or if the user clicked on what the user believed to be an opportunity/error but was not, the scenario, including the audio track, continues to run without pausing. Optionally, the scenario can instead be paused, and the user can be informed of the user's failure during the pause.

Optionally, the user is not provided with prompts during the playing of the scenario to better ensure the user's attentive interaction.

Optionally, the user can be prevented or not provided with the ability to rewind or play back sections for a "do over" until the entire segment is completed and initially scored.

Once the segment is complete, the system automatically presents the user with the user's score for the segment. Optionally, the user can be provided with the scores of others for the segment and/or the user ranking relative to other users.

Preferably, the user repeats the particular audio and/or video pre-recorded segment within a specified period of time, such as 24 hours, with peers and/or coaches to solidify and advance the learning. Optionally, when the audio and/or video segment is repeated, the user is to intervene as described above, but if the user correctly identifies the existence of an opportunity/error, the questions described above are not displayed to the user. Instead, optionally, a coach is automatically provided with the question and answer by the training system, such as via a computer screen, and/or via a coaching manual. The coach can ask the user the same or similar questions presented to the user when the user previously went through the segment. However, in this case, the user is to proactively verbalize the correct answers without prompting previously provided via the multiple choices, and/or true/false statements. The coach can store in the user performance (e.g., the number of correct answers, the number of opportunities identified, etc.) in computer readable memory. The system can then calculate and display a score.

Preferably, although not necessarily, the user participates in a new scenario each day or each working day.

The training procedure can be modified as desired. For example, the presentation of a training scenario can be presented to a participant as similarly described above, except that the participant is instructed to write down (or type into a field presented on the participant terminal) the opportunities and errors that the user believes he heard or observed. Once the segment has completed, the participant can be instructed to write down (or type into a field presented on the participant terminal) why there were opportunities and errors, as well as the methodologies that can be used to capitalize on the opportunities and correct the errors. The user then presses an "answer" icon or the like, and the segment replays, and automatically pauses at the pre-programmed areas/opportunities, at which point the correct answers are displayed in conjunction with the participant's previously written responses. Optionally, a coach or other supervisor monitors the foregoing to reduce cheating.

Optionally, if a user misses the error in the training scenario (e.g., in the script of the program), after a short window of time (e.g. a predetermined, set period of time, such as 3 seconds, 5 seconds, 15 seconds, or 25 seconds), the program will provide a verbal and/or visual notification to the user that an error has been missed. The scenario presentation can then be, "rewound" to the point where the error was presented (or shortly before the error was presented) and a drop-down menu or multiple choice form is presented to the user listing several possible errors, wherein one of the listed errors is the error that actually occurred. The user is asked to select the error that occurred. If the user selects the correct error, the user's answer is scored as correct or as partially correct, to take into account that the user had to be prompted to select the correct error.

Example opportunities will now be described with respect to different types of training. In these examples, the opportunities are raised by a customer mentioning something during the scripted conversation. Selected opportunity-raising lines can be incorporated into corresponding scenario scripts.

Banking Related Opportunities

| SCRIPT | CORRESPONDING OPPORTUNITY |
| --- | --- |
| Customer mentions a trip | Offer to increase credit limit on credit card |
| Customer mentions a remodel | Offer home equity loan |
| Customer mentions a new child | Offer college savings account |
| Customer mentions inheritance | Offer investment product |
| Customer mentions an account with another institution | Offer to transfer the account to bank |
| Customer mentions credit cards with other institutions | Offer to consolidate credit card debt "It is possible to consolidate debt" |

Travel Agency Related Opportunities

| Script | Corresponding Opportunity |
| --- | --- |
| Customer mentions being tired of the cold | Offer trip to warm vacation spot |
| Customer mentions fear of flying | Offer train-based trip |
| Customer mentions loving to drive | Offer to arrange for a convertible car rental for vacation |
| Customer mentions enjoying food | Offer to arrange reservations at highly rated restaurants during vacation |
| Customer mentions having children | Offer to arrange for babysitter during trip |
| Customer mentions that customer is worried of trip related cancellation costs if customer becomes ill | Offer trip insurance |

FIG. 1 illustrates an example networked training system including a Web/application server 110, used to host the training application program and serve Web pages, a scenario database 112, that stores prerecorded scenario segments, and a user database 114 that stores user identifiers, passwords, training routines for corresponding users (which can specify which training scenarios are to be presented to a given user and in what order), training scores, and user responses provided during training sessions. The training system is coupled to one or more trainee user terminals 102, 104, 106 via a network 108, which can be the Internet or other network. Scenarios A-D, provided below, include example scenario scripts having embedded opportunities and errors, as well as example questions regarding the opportunities and errors. Scenarios A and B are directed to banking. Scenarios C and D are directed to a travel agency. The training systems and processes can also be used for other types of financial services, multi-level sales organizations, automotive sales and service, retailing, mass market sellers of products and services, personal relationships and so on.

Figure 2:
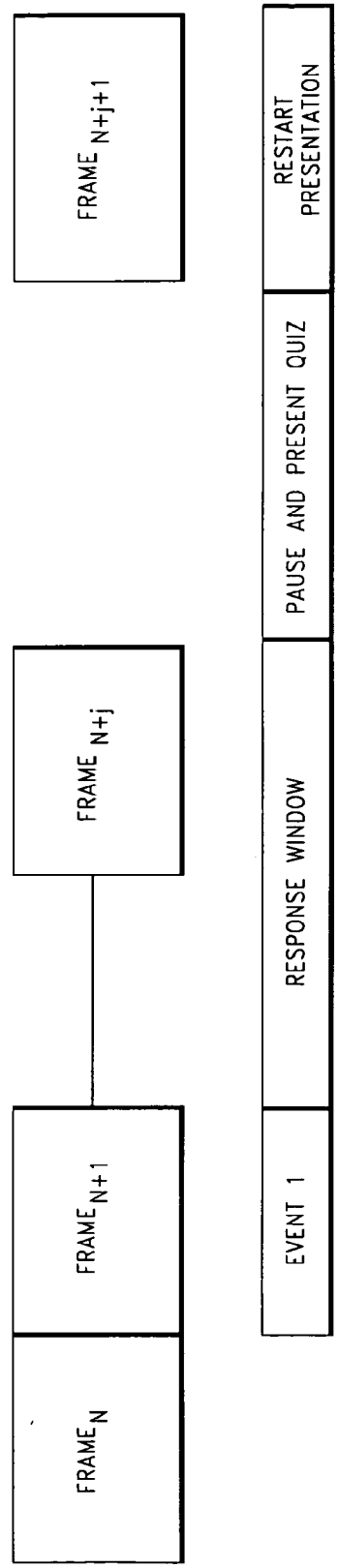
FIG. 2 illustrates an example training presentation.

FIG. 2 illustrates an example series of frames in a video/audio training presentation. The frames can be animation frames, video frames, or other type of frames. In this illustration, the frame sequence is shown in uncompressed form, although the frames can be compressed using a variety of compression techniques (e.g., a version of MPEG), which may result in certain frames being dropped. As illustrated, at Frame$_{N+j}$ an event Event1 occurs which the user is to identify (the event may occur over several frames, rather than one frame). A response window is provided within which the user needs to identify the event. If the user identifies the event within the window, the presentation continues until the end of the time window, at which point the presentation is paused and a quiz is presented. Optionally, no scenario frames are presented to the user while the presentation is paused. Once the user has completed the quiz, or optionally, after a predetermined amount of time, the presentation is restarted at Frame$_{N+j+1}$. If the user fails to identify the event at frame Frame$_{N+j}$, then Frame$_{N+j}$ (as well as an optional number of frames before and after Frame$_{N+j}$) will be presented to the user again.

Figure 3A:
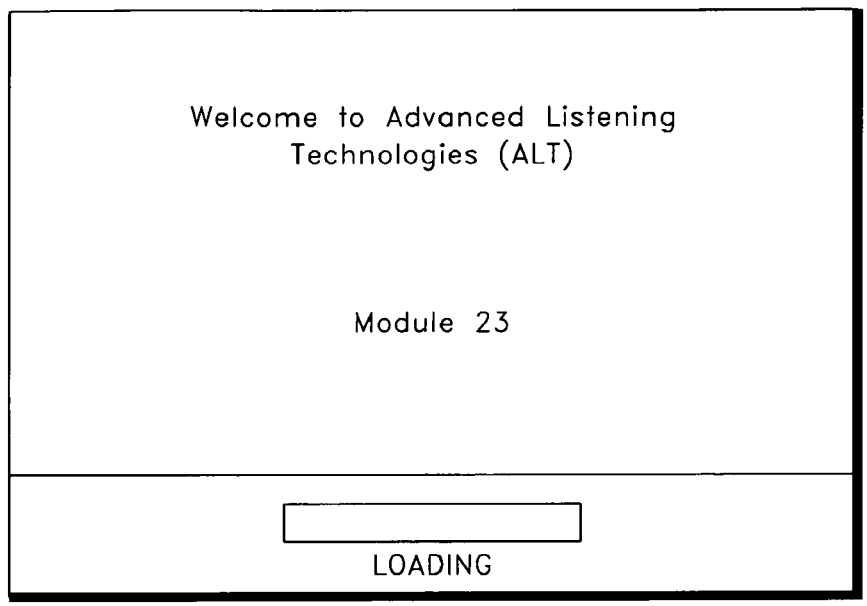
FIGS. 3A-Y illustrate additional example user interfaces.
Figure 31:

FIGS. 3A-Y illustrate additional example user interfaces for training personnel in the financial services field, which can be accessed from a training Website via the Internet, from a local user terminal memory, or otherwise. Other interfaces can correspondingly be used for other applications (e.g., training of travel agents, retail store customer service personnel, managers, teachers, parents, siblings, spouses, actors, singer, etc.). In this example, a bank customer service person (e.g., an employee) is interacting with a bank customer. In this example, the optional visual component of the dramatic interaction is provided via animated figures sequenced with an audio track, although video sequences or real people can be used as well. Optionally, user accessible controls (e.g., rewind, pause, fast forward, play, etc.) are provided to the trainee to allow the trainee to control the presentation. The controls can be "soft" buttons displayed on a computer monitor and activated via a mouse, keyboard, or other user interface, and/or the controls can be provided via a dedicated physical control, remote control device, or otherwise.

In this example, the trainee will review a presentation of an example interaction (e.g., a simulated interaction) first in an "uninterrupted mode" and then in an "interactive mode". In the uninterrupted mode, the trainee may take notes regarding errors made by the customer service person (e.g., an employee) in following a bank-specified customer interaction routine, and opportunities missed by the customer service person, wherein the opportunities may be provided by the customer's remarks. However, in uninterrupted mode, the presentation will not be paused for quizzes, and optionally, the pause and rewind controls are disabled and/or are not presented. Optionally, the trainee can skip the uninterrupted mode presentation. For example, optionally, if the user has previously viewed the interaction presentation, a skip uninterrupted presentation button (e.g., a "skip part 1" control) is presented and enabled, which, when activated by the user, will cause the interactive presentation to be presented without presenting the uninterrupted presentation.

In the interactive mode, quizzes are presented and the trainee's answers are recorded in computer readable memory, such as in the database discussed above, in association with an identifier associated with the trainee, and in association with an identifier associated with the corresponding training module. For example, during the presentation the trainee may be requested to indicate when the trainee has identified an error in the customer service person following a prescribed customer interaction routine (e.g., first greet the customer, ask the customer what the customer came in for, ask the customer when the customer last refinanced their home, ask the customer if the customer has any upcoming large expenditures, etc.). An additional quiz, such as a quiz asking the trainee to identify opportunities missed by the customer service person, may optionally be presented at the completion of the enactment.

As similarly discussed above, with respect to the quiz presented during the course of the simulation presentation, the trainee may be provided a window of time in which the trainee needs to identify an error. For example, the trainee may need to identify an error within a window of 7 seconds after the occurrence of the error (or after the end of the sentence, phrase and/or concept being presented that includes the error) in order to receive a score indicating a successful error identification. Other windows of time can be used as well, such as 11 seconds. Optionally, different time windows can be used based on the difficulty of the test, the particular question, the rating or experience of the trainee, and so on.

In one example embodiment, a control, such as a Phrase, Error, and/or Stop button (which will sometimes be referred to as an Error/Stop button), or other control of a first color (e.g., red) is presented which the trainee clicks or otherwise activates on in order to indicate that the trainee identified an error, an opportunity, or a significant phrase. Optionally, in addition to the button, the trainee can click in a larger area (e.g., an area surrounding and/or including the button) in order to identify an error. If, upon the occurrence of an error, the trainee clicked on the Error/Stop button (or other designated area) within the corresponding time window, the Error/Stop button will change colors (e.g., to green), and the trainee will receive an appropriate score. Optionally, the interactive presentation does not stop immediately upon the clicking of the Error/Stop button. Instead, the interactive presentation continues to be presented until the end of the sentence, and/or concept being presented. Optionally, the simulation can be halted substantially immediately after the Error/Stop button is activated. After the correct activation of the Error/Stop button, a pop-up quiz is then presented to the trainee. For example, the pop-up quiz can include one or more multiple-choice questions. Where there is more than one question, the questions are optionally presented sequentially. Optionally, the pop-up quiz is not a timed quiz, although in one embodiment, the quiz is timed (e.g., the trainee has to answer the quiz question(s) within a predetermined time window) to provide for speed testing.

Optionally, if the trainee incorrectly answers a quiz question, the quiz question may be presented again to the trainee and the trainee can again attempt to correctly answer the quiz question. The number of retries can be set to "1" or another designated number (e.g., 2 or 3). Optionally, different trainees may be provided with a different number of retries, based on certain trainee characteristics (e.g., the trainee's job title, the number of times the trainee has viewed or utilized the training presentation, etc.). Optionally, the number of retries offered can be varied based on a quiz or quiz question characteristic (e.g., the perceived quiz difficulty, the number of choices in a quiz multiple choice question, etc.). If, after utilizing the designated number of retries, the trainee has failed to correctly complete the quiz question, the correct answer is optionally presented (optionally, while also presenting the quiz question) to the trainee before the presentation continues.

A score is assigned to the trainee's quiz performance (e.g., based on whether the trainee correctly answered the quiz, how many retries the trainee needed to correctly answer the quiz, and/or the time it took the trainee to correctly answer the quiz, etc.), and the score is stored in computer readable memory in association with a trainee identifier and a presentation module identifier. The simulation presentation then continues (e.g., automatically, after completion of the quiz or in response to a trainee command).

If the trainee incorrectly indicates that an error occurred during the presentation by activating the Error/Stop button, for example, when no error had occurred within a selected window of time (e.g., 7 seconds) prior to the activation of the Error/Stop button, optionally, the Error/Stop button does not change color (e.g., the Error/Stop button remains red). Optionally, the button has an error message displayed thereon and the button changes color to indicate an erroneous activation. The trainees score is decremented or otherwise adversely affected to reflect the incorrect identification of an error. The simulation presentation is optionally not stopped or paused at this time, but is allowed to continue without interruption.

If the trainee fails to timely (e.g., within a selected window of time after the occurrence of the error or after the end of a phrase or sentence within which the error occurred) identify (e.g., by activating the Error/Stop button) an error that occurred during the presentation, optionally the Error/Stop button's color is changed (e.g., to green or another color), a text and/or graphic message is displayed indicating that the user missed the error, the presentation automatically stops, and the portion of the presentation in which the error occurred is automatically replayed. Optionally, the replay begins at a predetermined portion of the presentation before the error occurred, and/or the replay ends at a predetermined portion of the presentation after the error occurred, and a pop-up quiz (e.g., the multiple choice quiz discussed above) is presented. Quiz retries, scoring, and the correct answer presentation may be performed as similarly described above. The simulation presentation then continues (e.g., automatically, after completion of the quiz or in response to a trainee command).

At the conclusion of a simulation presentation another type of quiz is optionally presented, which, for example, can relate to missed opportunities. A list of phrases is verbalized and supported by identical or corresponding text messages. Each of these phrases is presented on a separate screen. For example, the trainee may be asked to identify when an "Event phrase" (e.g., a phrase that indicates an opportunity for the customer service person to offer additional services to the customer) is correctly identified. The phrase may be presented via the training terminal textually, audibly, and/or in the context of a visual interaction between two people. Optionally, this portion of the quiz is time-pressured. For example, a user interface is provided with the text displayed and phrases spoken for only a predetermined window of time (e.g., approximately 3 seconds). If the trainee correctly clicks on a designated area (e.g., the text message or other designated area), corresponding feedback is provided to the trainee (e.g., a positive tone is generated and/or a text acknowledgement appears indicating that the correct phrase was identified by the trainee).

If the trainee does not correctly click on a designated area (e.g., text message) within a predetermined amount of time, the next phrase quiz is automatically presented within a predetermined amount of time (e.g., 3 seconds or other desired period). Optionally, at the time the trainee fails to identify an event phrase, an indication of the failure is not provided to the trainee, although in another embodiment, such an indication is presented to the trainee. A score is recorded and presented to the trainee and, optionally, to a training supervisor or other designated personnel, indicating or corresponding to, the number of correctly identified event phrases, the number of correct multiple-choice answers, the number of unidentified event phrases, and/or the number of missed presentation errors. Optionally, a cumulative score (e.g., a number score, a graded score, or other score) that reflects the total trainee performance for a given module or for multiple modules can be provided in addition to, or instead of separate scores for each quiz or test type.

Optionally, once the phrase identification portion of the quiz is completed, a multiple-choice or other quiz is automatically presented to the trainee, which optionally follows the format of the pop-up quiz discussed above.

Optionally, a module can include detail oriented timed testing. For example, a detailed audio and/or video narrative can be played to a trainee. The training system automatically pauses at various points (e.g., predetermined points) during the narrative and tests the trainee on how much narrative detail the trainee remembers and/or on the trainee's listening and/or reading comprehension. Optionally, the test questions are timed, wherein the trainee has a set limited time in which to answer a given question and/or a set of questions (e.g., true/false questions, multiple choice questions, or questions requesting the entry of a word or multiple words). After the trainee answers a question or set of questions and/or after a predetermined amount of time elapses, the narrative resumes and continues until the next predetermined point in the narrative, and another question is presented to the user. The foregoing process continues until the narrative end is reached. Optionally, the user is provided with feedback after each question and/or set of questions is answered, the feedback indicated whether the questions were correctly answered. Optionally, if the user answers a question incorrectly, the user may be given another chance to answer the question.

Optionally, a module can include "intrusive thoughts" practice. During a module, such as during the playing of a scenario, the user is instructed to indicate (e.g., by clicking on an appropriate icon or other designated area) when a "foreign thought", not related or not significantly related to the task hand, enters the users mind. The user indication can be stored in memory and the user can be provided with an indication as to how many "foreign thoughts" the user had. The foregoing process is intended to bring awareness of intrusive thoughts to the user and to help the user practice refocusing their thoughts on the subject at hand.

Two additional training sessions will now be described to further illustrate examples of the training system and processes. The first example emphasizes the interactive aspects of a training session where the training session has a relatively higher degree of interactivity, and the second example emphasizes listening comprehension training, wherein the interactivity is relatively more limited (e.g., wherein interactivity with the training system is optionally limited to quizzes).

In the first example:
1. Text instructions with a pre-recorded audio that corresponds to the text instructions are stored in computer readable memory (e.g., a training module scenario database), optionally on a screen-by-screen basis.
2. Optionally, a pre-recorded audio-animation or live action simulation ("Simulation") is stored in the module scenario database, wherein the simulation includes "Events". By way of example, Events optionally include, but are not limited to, one or more of active errors, errors of omission, opportunities, missed opportunities, style and tone problems, etc. The system can instruct the User which type of Event the User is to identify.
3. The User (e.g., a trainee or other user) starts the simulation by clicking on an appropriate user interface control (e.g., a "Continue" icon).

In this example, the initial viewing/hearing of the simulation is performed in a non-interactive mode, wherein the mode purposely does not provide any or substantial interactive capability. The User is instructed to listen and/or to take notes, and to thus be prepared for the interactive simulation that follows.

4. The User can listen to the non-interactive simulation a predetermined number of times (e.g., one time or some other designated number of times) prior to beginning the interactive simulation mode.

5. The User can elect to skip the non-interactive simulation and substantially immediately proceed to the interactive simulation by clicking on an appropriate control (e.g., a "Skip" icon).

6. The interactive simulation can be initiated by the User after the non-interactive simulation has been performed by clicking on an appropriate control (e.g., a "Continue" icon).

7. Once the interactive simulation begins, the User optionally cannot exit (via the training application software) the simulation prior to completion and/or is prevented from returning to the non-interactive simulation. (Optionally, the user can exit by closing an appropriate interface, such as a browser, used to access the simulation, by turning off the User terminal, or otherwise). If the User prematurely exits the interactive simulation, the User's score will appropriately reflect such exit.

8. The User can stop or pause the interactive simulation by correctly identifying an appropriate Event (e.g., by clicking on an appropriate control, such as a "Error" or "Stop" icon within a predetermined amount of time of the presentation of the Event). Optionally, if the user clicks on the icon within a predetermined time window (e.g., 5 or 10 seconds) after the occurrence of an Event, then the User will be scored as correctly identifying the Event occurrence. This helps ensure that the User is being tested on knowledge versus "clicking speed."

9. When the User correctly stops the interactive simulation by clicking on the "Error" or "Stop" icon, the color of this icon changes (e.g., from red to green), and optionally a confirmation tone is played, signifying a correct response.

10. When the User correctly stops the interactive simulation as described above, in this example, the interactive simulation does not stop immediately upon clicking the Stop icon (unless the icon is correctly clicked at the moment when the corresponding sentence, phrase and/or concept is programmed to end). Instead, the interactive simulation continues to be presented until the end of the sentence, phrase and/or concept being presented. Advantageously, this makes available the full or adequate context of what has been said for answering of the subsequent quiz (e.g., a multiple-choice question). In addition, this feature provides continuity when the interactive simulation is re-started, as opposed to re-starting the simulation mid-word or mid-sentence.

11. When the User has correctly clicked on the icon, (and as previously described, the icon turns green and the interactive simulation pauses at the end of the sentence, phrase and/or concept) then a quiz question, such as a text-based multiple-choice test, automatically appears.

12. If the User correctly identifies or provides the answer on the first attempt, a positive confirmation tone occurs, and a text or audible voice message acknowledging the correct answer is played. Optionally, if the quiz question is a multiple choice question, the correct answer becomes encircled, bolded, or otherwise highlighted.

13. At this point, the User activates a "Continue" icon, or other appropriate control, to advance to a second quiz, such as a second multiple-choice question.

14. If the User answers incorrectly on the first attempt at answering the quiz question, then a "negative tone" is played, and a graphic and/or text message is provided indicating that the answer was incorrect.

15. A text and/or message then appear, or are otherwise provided, instructing the User to try to answer the quiz question again.

16. The User answers the quiz question again, and if the answer is correct, the process proceeds as described at states 11 and 12 above, and another quiz question is presented to the User.

17. If the User tries to answer the quiz question again, and the User is incorrect a second time, a "negative tone" is played, and a graphic and/or text message is provided indicating that the answer was incorrect.

18. If the second answer attempt was incorrect, then the process automatically causes the correct answer to be displayed or indicated to the User.

19. At this point, the User clicks a "Continue" icon, or other appropriate user control, to advance to the second multiple-choice quiz.

20. States 12 through 19 are repeated for the second quiz question.

21. Once the User completes the two quiz questions (or other designated number of quiz questions), the User clicks on the "Continue" icon, and the interactive simulation resumes.

22. Scoring is performed by the system that reflects the number of correctly and/or incorrectly User-identified Events.

23. The User's quiz answers are scored by the system.

24. When the User incorrectly (e.g., when no Event occurred within the designated time window) identifies an Event and attempts to stop the interactive simulation by clicking on the "Error" or "Stop" icon, the Stop icon does not change color. Instead, the Stop icon remains red, indicating to the User that the User incorrectly identified an Event.

25. Scoring is performed by the system that reflects the incorrect identification of Events.

26. If the User misses an Event by not clicking on the icon during the designated time window, the system automatically stops the interactive simulation (e.g., at the appropriate end of the sentence, phrase and/or concept).

27. A negative tone is played and a graphic and/or text display appears indicating that the User missed an Event, and optionally the system informs the User as to which Event was missed.

28. Scoring is performed by the system that reflects the missed identification of Events.

29. The User is optionally prevented from advancing without next activating the "Replay" icon, or other appropriate control.

30. When the "Replay" icon is activated, a replay of the Event is automatically performed by the system (e.g., a replay of the corresponding entire sentence, phrase and/or concept).

32. A quiz is automatically presented to the User (e.g., a text-based multiple-choice test).

33. States 12 through 23 above are then performed.

34. A list of phrases is verbalized by the User terminal and corresponding and/or identical text messages are displayed to the User. Optionally, each of the phrases is sequentially presented on a separate screen.

35. The User is instructed to click on the designated area (e.g., the text message or surrounding area) when an "Event phrase" is correctly identified. Optionally, this identification process is performed under time pressure. For example, the phrase pages appear with the text (with spoken phrases correspondingly provided) for only a limited time period (e.g., approximately 3 seconds).
36. When the User correctly clicks on the designated area (e.g., the text message or surrounding area), a positive confirmation tone sounds and a text, graphic or other acknowledgement appears confirming that the User selected the correct answer.
37. Then a quiz (e.g., a multiple-choice test) automatically appears which optionally follows the format of the previously discussed quizzes. The quiz can also be different than the previous quizzes (e.g., a single multiple-choice test may be provided that includes a single question).
38. If the User does not correctly click on a designated area (e.g., text message or surrounding area), the next screen and messaging occurs within a certain amount of time (e.g., within three seconds).
39. Optionally, the system does not provide a "negative tone" or text acknowledgement when the User misses identifying an Event phrase.
40. Scoring is performed by the system that reflects the correctly identified Event phrases, the correct multiple-choice answers, and the unidentified Event phrases.
41. Scores are totaled by the system at the end of each module, although the scoring can be updated and totaled upon the occurrence of a scoring event (e.g., a quiz). The scores can be displayed to the User. The scores can be stored in computer readable memory for later access by the User, the User's training supervisor, the User's manager, or other by other designated users.

Optionally, the User can review the simulation again at a later time, such as the next day. Optionally, rather than having the quizzes provided by the system, the User can review the simulation with the User's manager who can verbally quiz the User by asking questions. The manager can record the User's performance (e.g., the number of questions answered correctly) on the system in association with a User identifier.

In the second example:
1. A User views/listens to one or more non-interactive simulation presentation. The length of the non-interactive simulations can vary (e.g., from 30 seconds or 60 seconds to several minutes or even hours).
2. The system prevents the User from viewing/listening to a non-interactive simulation a second time prior to testing.
3. At the end of the non-interactive simulation presentation, the User clicks on the Continue icon and is quizzed on the non-interactive simulation content (e.g., a multiple-choice and/or true-false test based upon what the User heard and/or saw during the non-interactive simulation).
4. The system scores the test.
5. At this point, the User can listen to the non-interactive simulation a second time.
6. The User can then elect to be tested a second time.
7. The system scores the second taking of the test. The scores are optionally stored and presented as similarly discussed above in the previous example.

A training format categorization can be used to separate and/or define the different functionality possibilities that can occur in training modules, and that can segment them between business-based modules and consumer/personal/general public modules. In an illustrative example, training modules can include the following format and subject categories as follows, although other categorizations can be used as well:

1. User Format (e.g., personal relationships, consumers, business)
2. General Format (e.g., Quiz Interactive or Full Interactive)
3. Specific Format
4. Subject or Scenario By way of example, with respect to the General Format, Quiz Interactive generally limits substantive interactivity to quizzes (e.g., multiple choice or other quizzes, such as listening comprehension quizzes) presented at the end of the scenario. Full Interactive generally provides for substantive user interactivity throughout or at multiple points in the scenario (e.g., by pressing an error/stop control to indicate that an error and/or missed opportunity occurred). Optionally, the Full Interactive mode includes one or more quizzes after the scenario presentation ends.

The Specific Format can include some or all of the following:
Quizzes/questions presented after the scenario is presented
Timed questions presented (e.g., speed testing) at various points during (e.g., throughout) the scenario presentation
Questions regarding communication attitude and/or style
Self-revealing statements made at various points during (e.g., throughout) the scenario presentation
Errors made at various points during (e.g., throughout) the scenario presentation by a character in the scenario
Opportunities presented at various points during (e.g., throughout) the scenario presentation (e.g., opportunities provided by a character, such as a customer, in the scenario)
Detailed Oriented Timed Testing with questions regarding a detailed narrative presented at various points during the scenario
Intrusive Thoughts Practice, wherein the user indicates when a "foreign thought", not related or not significantly related to the task hand, enters the users mind The Subject or Scenario can include, for example:
Banker and Prospect/Customer
Travel Agent and Customer
Doctor and Patient
Manager and Subordinate
Husband and Wife Therapy
Parent and Child
Arguing Neighbors
Car Salesman and Prospect
Driving The following table illustrates several example module configurations:

| | SUBJECT/ SCENARIO | USER FORMAT | GENERAL FORMAT | SPECIFIC FORMAT |
|---|---|---|---|---|
| 1 | Spouse Therapy | Consumer/ Business | Quiz Interactive | Questions at end of scenario |
| 2 | Spouse Therapy | Consumer/ Business | Full Interactive | Questions regarding communications attitude and style |
| 3 | Spouse Therapy | Consumer/ Business | Full Interactive | Self-revealing statements |
| 4 | Parent and Child | Consumer | Full Interactive | Errors during scenario |

-continued

| | SUBJECT/ SCENARIO | USER FORMAT | GENERAL FORMAT | SPECIFIC FORMAT |
|---|---|---|---|---|
| 5 | Conversation While Driving | Consumer | Quiz Interactive | Timed questions during scenario |
| 6 | Neighbors | Consumer | Quiz Interactive | Questions during scenario |
| 7 | Car Salesman & Prospect | Business | Quiz Interactive | Questions at end of scenario |
| 8 | Banker and Prospect/ Customer | Business | Full Interactive | Errors and opportunities during scenario |

Figure 4A:
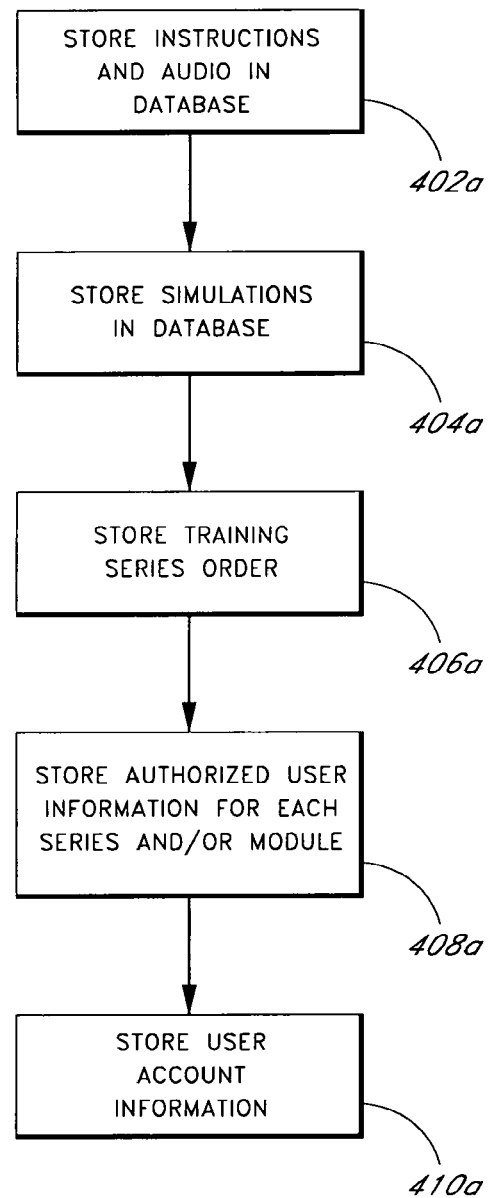
FIGS. 4A-G illustrate example processes flows.

FIGS. 4A-G illustrate example processes for setting up an example training system, and for performing example training processes. With reference to FIG. 4A, at state 402a, user instructions for a given module, and/or for modules in a selected training are stored in a database, such as the database 112 illustrated in FIG. 1. For example, a given module can have module specific instructions, or the same instructions can be used for a certain set of modules (e.g., modules in a given field, such as financial services). The instructions can include text and/or voice instructions. The instructions can be stored in association with the modules to which the instructions apply. At state 404a the module simulations are stored in the database. As previously discussed, the simulations can be in the form of animated sequences and/or video segments.

At state 406a, a user, such as a training administrator or a manager, can define a training course including multiple modules. For example, the training administrator can specify via a user interface which modules are to be presented as part of a specific training series, and the sequence order in which the modules are to be presented to a given trainee. In addition, the training administrator can define questions and quizzes, indicate or provide the correct answers, specify answer window time lengths, and specify scoring for correct and incorrect answers. The training administrator specification is stored in the database and is later accessed when a trainee logs in to undergo a training session. Optionally, the training administrator can be provided with specific and/or limited authority to edit or specify training sessions.

Optionally, training sessions can be customized for a given trainee. For example, a training administrator can select appropriate modules and arrange them in an appropriate sequence for a given trainee based on the trainee's job function, level of experience, and/or previous training. In an example embodiment, the training administrator can specify the modules and module sequences by entering module names into a form in the desired order or by dragging and dropping icons or text corresponding to the desired modules into the desired order.

At state 408a, the training administrator can specify which trainee is authorized to access which modules or series of modules. For example, an identifier corresponding to the authorized trainees can be stored in a database (e.g., database 112 and/or database 114 illustrated in FIG. 1) in association with the corresponding modules or series of modules (e.g., in association with module identifiers or in association with an identifier associated with a sequence of modules).

At state 410a, user account information is stored in a database, such as database 114. The user account information can include a user identifier, a user password, a job title or classification, the number of years the user has been employed with the employer authorizing the training session, the length of time the user has been employed in a given field, an identification of the modules and/or series of modules the user has completed and the corresponding scores and completion dates, and a training schedule for the user indicating a training frequency and/or when (e.g., which day or which week) the user is to view a particular module or series of modules. The user account information can be entered via a form and/or from another database by the user, an administrator, and/or other entity.

Figure 4B:
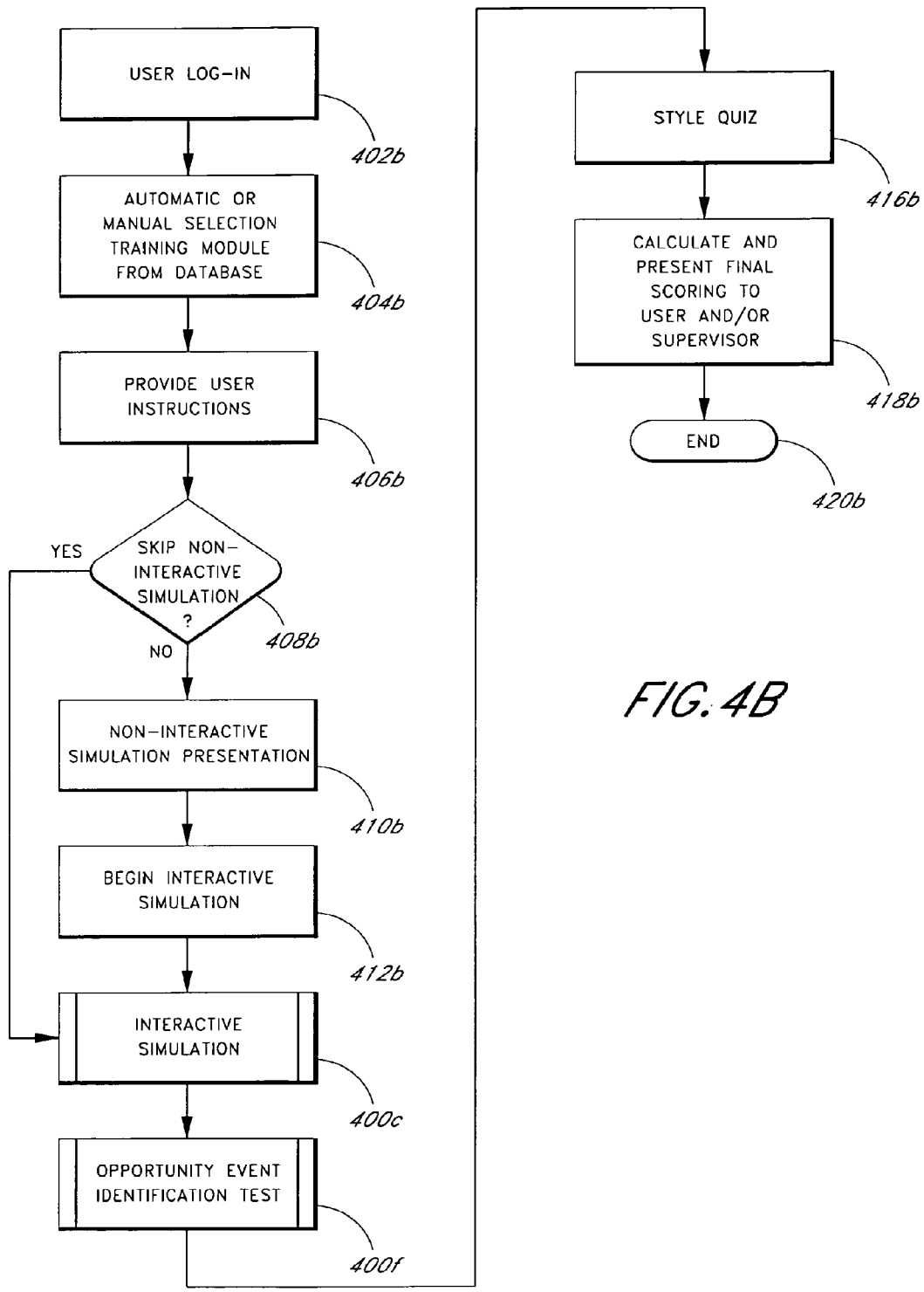

Referring now to FIG. 4B, an example training session process is illustrated. At state 402b, a trainee (also referred to as a user) logs into the training session via a terminal. If the training session is password protected, the user may be asked to enter a password. At state 404b, the appropriate training module is selected from the training module database. The database can be remote from the user and accessed over a network, or the database (or a portion thereof) can be stored locally, in the user terminal memory. If the user is so authorized, the user may be presented with a list of modules which the user is authorized to access and from which the user can select the appropriate module or module series. Optionally, instead, the training system automatically selects the appropriate training module or modules based on information retrieved from the appropriate system database. For example the information can include an identification of the training courses the user is authorized to access, an identification of which modules have already been completed by the user, the user's scores on one or more already completed training modules, and the user's training schedule as previously defined by a training administrator or the user.

At state 406b, the training user instructions are retrieved from the appropriate database and displayed and/or played back to the user via the user terminal. In addition, module and/or module series identification can be presented to the user (e.g., "This is module 10 in the Loan Officer Training Series"). At state 408b, a determination is made as to whether the user has indicated that a non-interactive training simulation is to be skipped, and if so, whether the user has met the prerequisite skip conditions (e.g., has previously viewed the simulation at issue). If the user has not provided a skip instruction and/or has not met the requisite skip instructions, the process proceeds to state 410b, and the appropriate simulation is played via the user terminal. In the non-interactive mode, the user is not provided with any or substantial interactive capability (e.g., the user is not provided with quizzes or tests during the simulation playback). If the user indicated that the non-interactive mode is to be skipped, and if optionally specified skip criteria are met (e.g., if the user has previously viewed the interaction presentation), the process proceeds to state 400c.

Once the non-interactive simulation is complete, at state 412b, the user can activate a control (e.g., a begin or a continue button or link) which causes the interactive mode to begin, and the process proceeds to state 414b. Optionally, instead, the interactive mode can automatically begin after completion of the non-interactive simulation without manual user activation. At state 400c, the interactive simulation is presented to the user. State 400c will be discussed in greater detail below with respect to FIG. 4C. After the completion of the interactive simulation, at state 400f, an opportunity event identification test is presented to the user. State 400f will be discussed in greater detail below with respect to FIG. 4F.

At state 416b, a style quiz is optionally presented to the user. The style quiz, for example, can include questions regarding the communication style, tone of voice, and/or manner of a "person" represented in the simulation. The person can be, for example, a person who is simulating performing the "job" function (e.g., a sales person, a financial adviser, a lawyer, a parent, singer, doctor with patient, etc.) for which the user is training. The style quiz, by way of example, can be in the form of a true and false question, a multiple choice question, and/or a question wherein the user's response can be provided using natural language, etc.

At state 418b, the user's scores (e.g., scores related to the number of quiz questions the user answered correctly, the number of quiz questions the user answered incorrectly, the number of events the user correctly identified, failed to identify, or misidentified, and/or the time it took the user to complete quizzes) are totaled in a given area, for example one or more of the following:

a score (e.g., a number, letter, or title) indicating the number of correct event identifications during the interactive simulation;

a score indicating the number of incorrect event identifications during the interactive simulation;

a score indicating the number of correct answers to the quizzes provided during the interactive simulation;

a score indicating the number of incorrect answers to the quizzes provided during the interactive simulation;

a score indicating a score indicating the number of correct event identifications during the interactive simulation;

a score indicating the number of incorrect event identifications during the interactive simulation;

a score indicating the number of correct opportunity identifications during the opportunity identification;

a score indicating the number of incorrect opportunity identifications during the opportunity identification;

a score indicating the number of correct style quiz answers;

a score indicating the number of incorrect style quiz answers;

a cumulative score indicating the overall performance on the module;

a ranking of the trainee relative to others in a selected set of trainees based at least in part on the trainee's score(s) or performance.

The system optionally presents one or more buttons, links, or menus via which the user can instruct the system to return to the module selection page, to proceed to the next module in the module series, to replay the current module, or to exit the training session. If the user elects to exit the training session, the process proceeds to End state 420b.

Figure 4C:
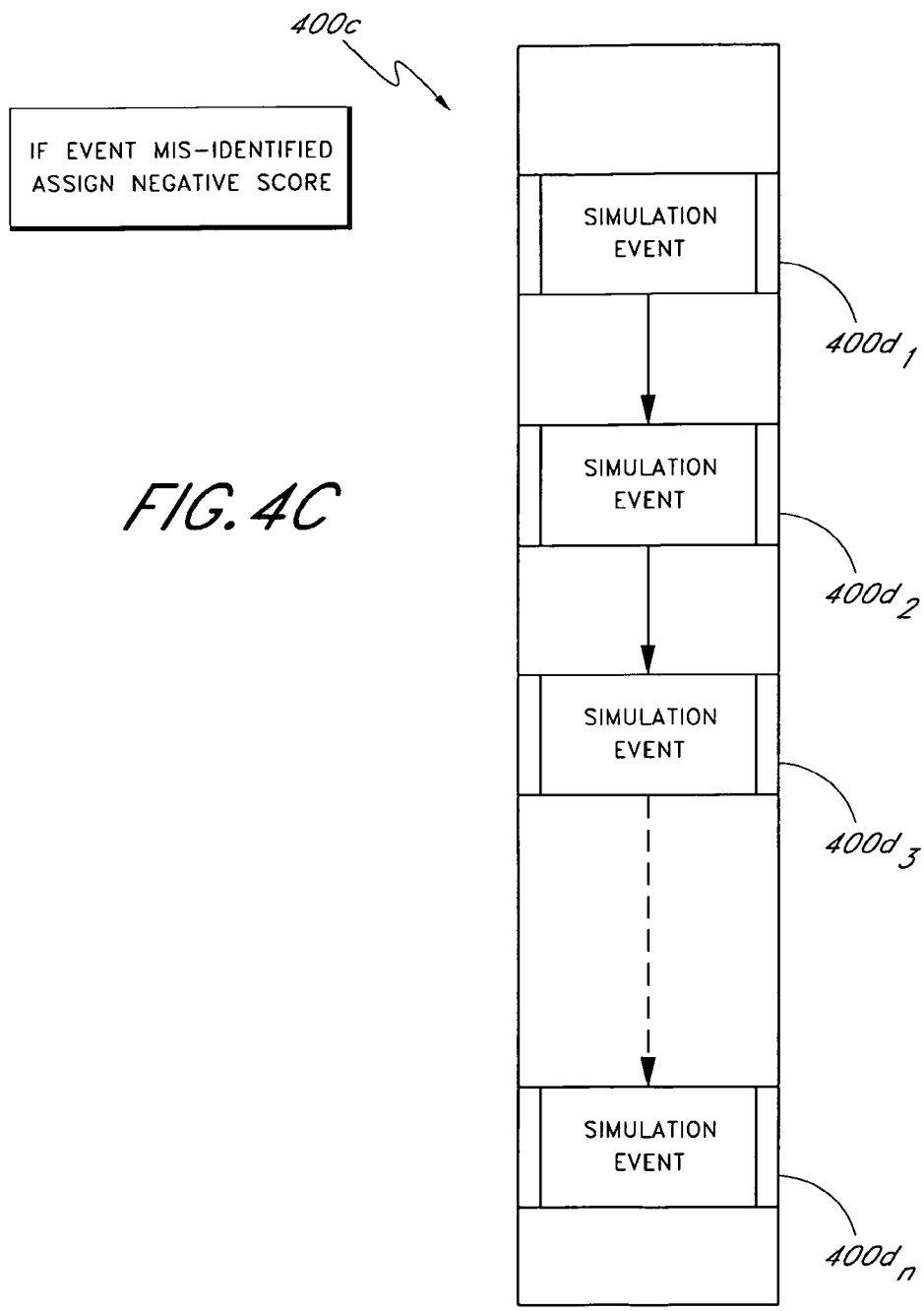

Referring now to FIG. 4C, interactive simulation state 400c is illustrated in greater detail. The simulation (which can instead be a presentation of any actual interaction) of an interaction corresponding to the skills to be trained is presented. The simulation includes multiple events 400D$_1$ to 400Dn, wherein a given event can be an active error, an error of omission, an opportunity, a missed opportunity, or a style or tone problem. Instructions, such as those provided at state 406b in FIG. 4B, can more narrowly define the types of events that the user is to identify (e.g., an active error or an error of omission). If the system detects a misidentification of an event (where the user indicated that an event had occurred, where none actually had occurred), a negative score is assigned to the misidentification, and the simulation continues uninterrupted. Optionally, negative feedback (e.g., an error tone, an error icon, error text, or a color change of a control or text) is provided to indicate that the user has misidentified an event occurrence. The negative feedback can be provided substantially immediately, or within a certain time window (e.g., within 10 seconds of the time window within which the user was to identify the event).

Figure 4D:
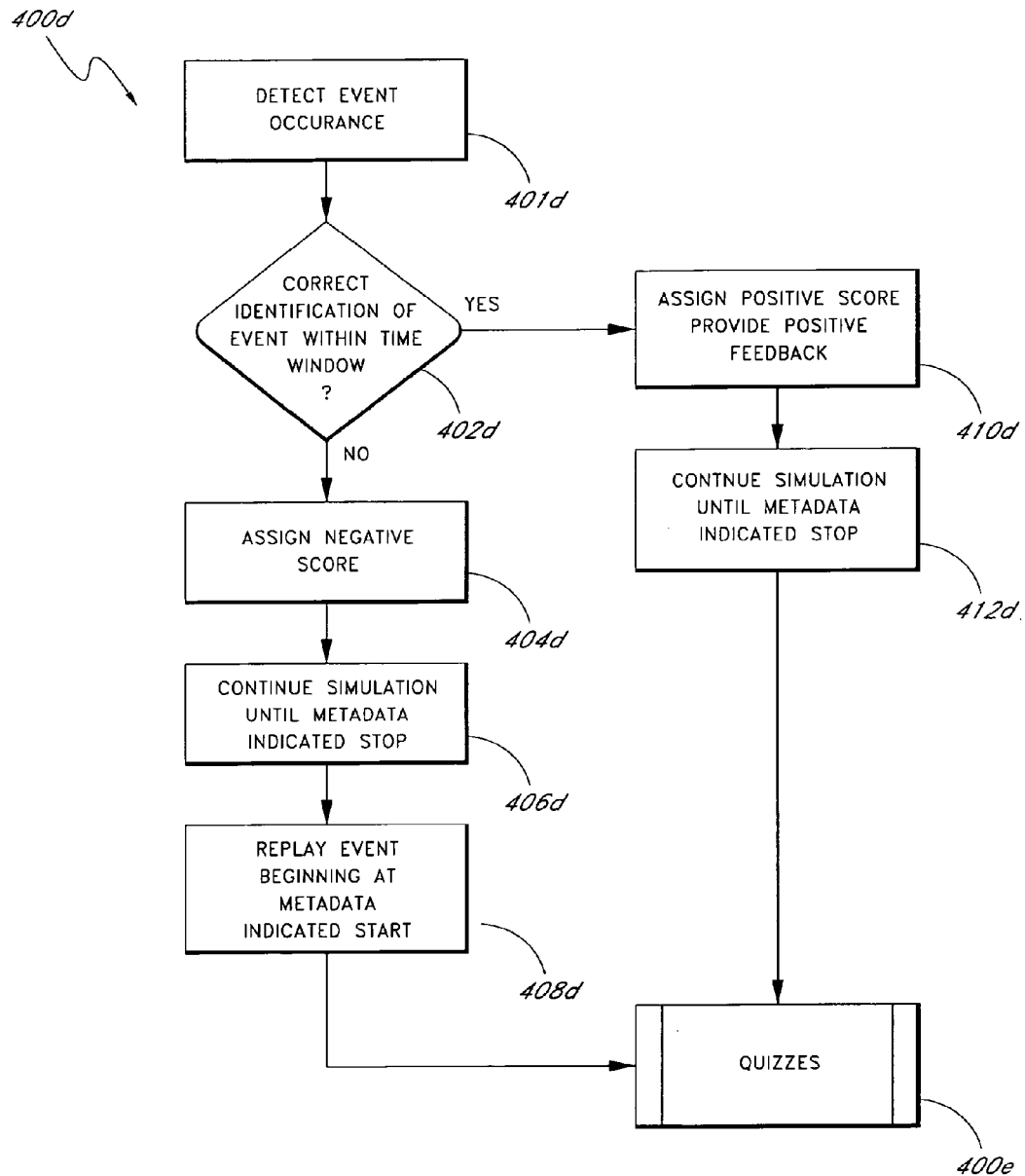

FIG. 4D illustrates an example of the process 400d performed during an event illustrated in FIG. 4C. With reference to FIG. 4D, at state 401d the system determines the occurrence of an event. The determination can be performed by reading digital metadata stored in association with the simulation, wherein the metadata indicates the occurrence of an event. The training system monitors user inputs to determine whether the user has identified the event occurrence within the specified time window. For example, the user can indicate that an event has been identified by one or more of clicking on a hard button, a soft button, by providing a verbal instruction, or via other user input.

If the user has identified an event, the process proceeds to state 410d, and a positive score is assigned to the user and stored in computer readable memory. The process proceeds from state 410d to state 412d, and the simulation is stopped in response to reading metadata that indicates a quiz is to be given. The process then proceeds to state 400e, and one or more quizzes are presented to the user. State 400e is discussed in greater detail below.

If, at state 402d, the user failed to identify the event within a corresponding time window, the process proceeds to state 404d, and a negative score is assigned and stored in computer readable memory. The process then proceeds to state 406d, and the simulation continues until a designed stop indicating the end of the sentence, phrase and/or concept being presented that includes the error. The process proceeds to state 408d, and the system replays the portion of the simulation that includes the end of the sentence, phrase and/or concept being presented that includes the error, beginning at a start point indicated by corresponding metadata and ending at the end of the sentence, phrase and/or concept being presented. The process proceeds to state 400e, and one or more quizzes are presented to the user.

Figure 4E:
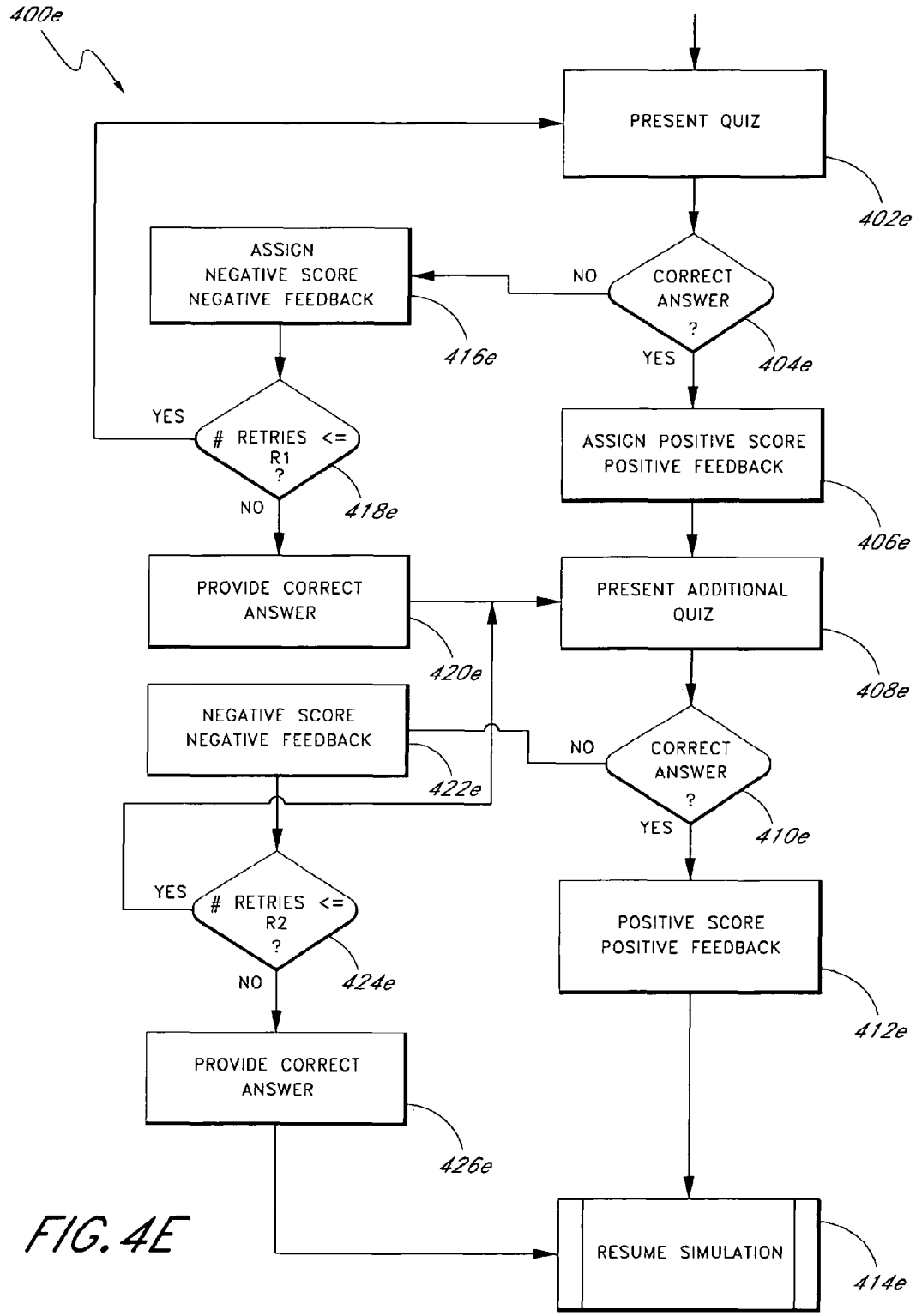

FIG. 4E illustrates a more detailed flow diagram of state 400E illustrated in FIG. 4D. At state 402e, a quiz (e.g., multiple choice, true/false, matching or free form questions) is presented to the user via the user terminal. At state 404e, the user quiz answer is received and a determination is made as to whether the user answered the quiz correctly.

If the user answered the quiz correctly, the process proceeds to state 406e and a positive score (indicating a correct answer was provided) is recorded and the user is provided with substantially immediate feedback (e.g., via a tone, icon, text, color change, etc.) confirming the user's answer is correct. At state 408e, a second quiz is optionally presented to the user. At state 410e, the user quiz answer is received and a determination is made as to whether the user answered the second quiz question correctly.

If the user answered the second quiz question correctly, the process proceeds to state 412e and a positive score is recorded and the user is provided with substantially immediate positive feedback. The process then proceeds to state 414e and the simulation resumes.

Referring back to state 404e, if the user provided an incorrect answer to the first quiz question, the process proceeds to state 416e, and a negative score is provided (indicating an incorrect answer was provided), and negative feedback is optionally provided substantially immediately. At state 418e, a determination is made as to whether the user has already attempted a predetermined permitted of retries (R1). If the user has not yet exceeded the predetermined permitted of retries, the process proceeds back to state 402e and the first quiz is presented again. The user can then attempt to correctly answer the first quiz question again. If, at state 418e, the system determines that the user has already attempted, but failed to answer the first quiz question R1 times, the process proceeds to state 420e, and the correct answer is provided to the user.

Similarly, referring back to state 410e, if the user provided an incorrect answer to the second quiz question, the process proceeds to state 422e, and a negative score is provided, and negative feedback is optionally provided substantially immediately. At state 424e, a determination is made as to whether the user has already attempted a predetermined permitted of retries (R2, which optionally has the same value as R1). If the user has not yet exceeded the predetermined permitted of retries, the process proceeds back to state 408e and the second quiz is presented again. The user can then attempt to correctly answer the second quiz question again. If, at state 424e, the system determines that the user has already attempted, but failed to answer the second quiz question R2 times, the process proceeds to state 426e, and the correct answer is provided to the user.

Figure 4F:
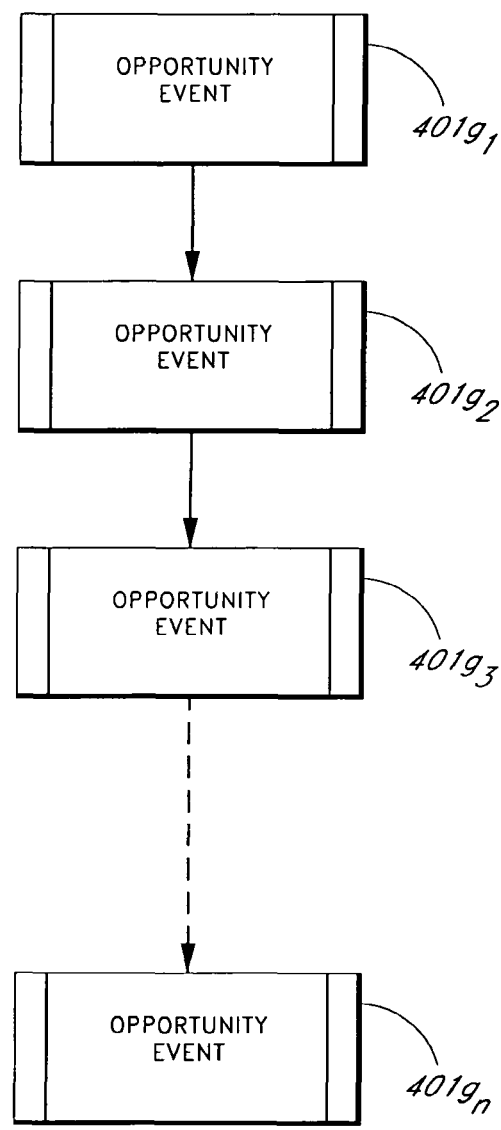
Figure 4G:
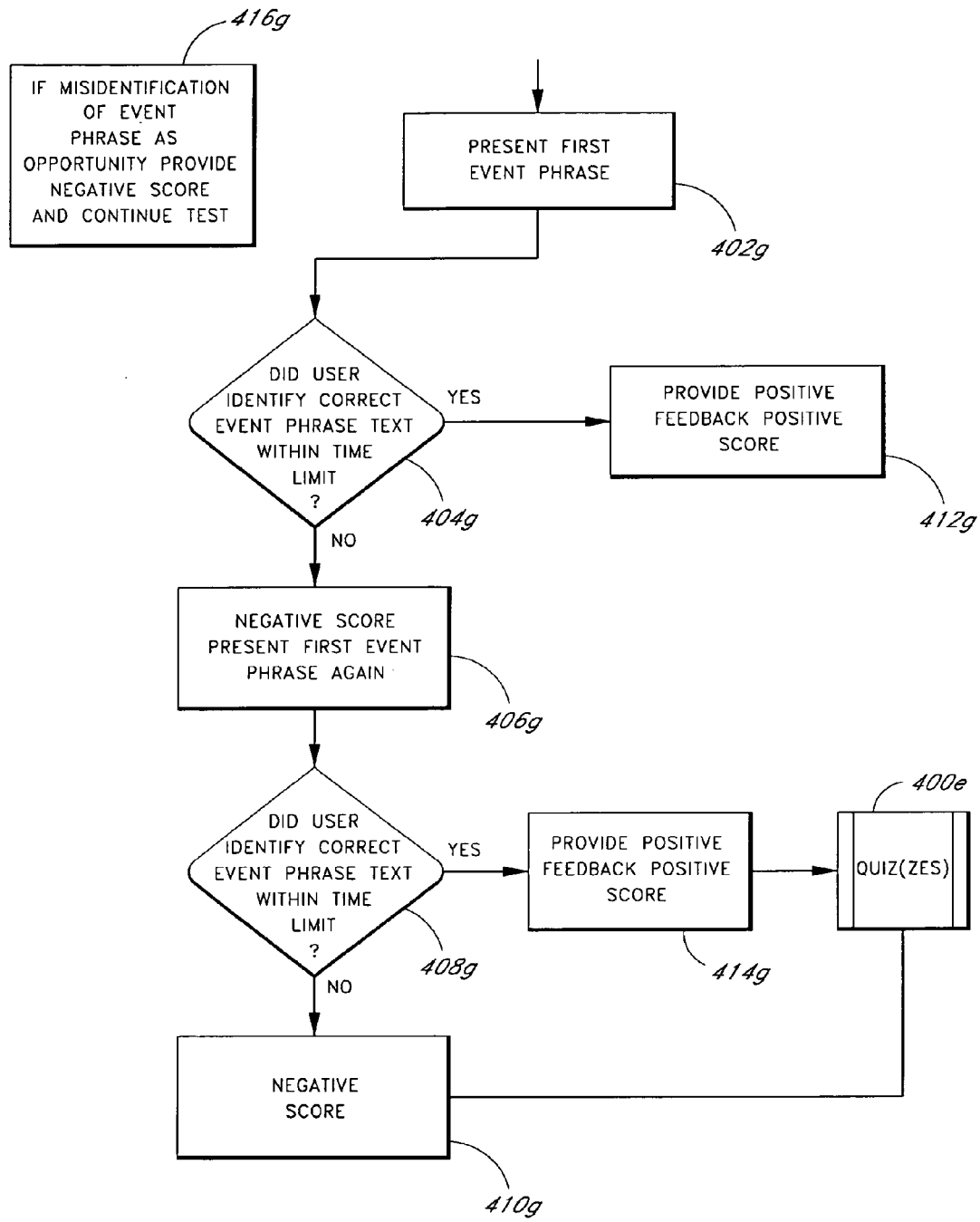

Referring now to FIG. 4F, state 400F discussed above with respect to FIG. 4B is discussed in greater detail. One or more opportunity event test $401g_1$-$401g_n$, are presented to the user. FIG. 4G illustrates an opportunity event test 401g in greater detail. In an example embodiment, the user will be asked to identify statements or phrases made by a first individual (e.g., a customer) during the simulation, which represented opportunities but that were missed by the second individual (e.g., the customer service person). The statements or phrases may be both textually presented to the user and audibly played to the user.

Referring now to FIG. 4G, at state 402g, a first event phrase is presented to the user. At state 404g a determination is made as to whether the user identified the correct event phrase within a predetermined time limit. If the user did correctly identify the event phrase within the time limit, the process proceeds to state 412g, and the system records a corresponding positive score, and provides the user with substantially immediate positive feedback. The process proceeds to state 400e, and one or more quizzes are presented to the user.

If, at state 404g, a determination is made that the user did not correctly identify the event phrase within the time limit, the process proceeds to state 406g, and the system records a corresponding negative score, and optionally provides the user with substantially immediate negative feedback. The user is provided with another opportunity to identify the event phrase. At state 408g, a determination is made as to whether the user identified the correct event phrase within a predetermined time limit on the second attempt. If the user did correctly identify the event phrase within the time limit, the process proceeds to state 414g, and the system records a corresponding positive score, and provides the user with substantially immediate positive feedback. If the user failed to correctly identify the event phrase, the process proceeds to state 410g, and a negative score is recorded.

Referring now to FIGS. 3A-Y, which illustrate example user interfaces, FIG. 3A illustrates an introductory screen display, informing the User which training module is about to be presented. FIGS. 3B-3G illustrate example screen displays that describe the skills the corresponding module will teach and/or improve, and provide the User with instructions on using the module. FIG. 3H illustrates an example screen display that further describes and provides instructions for the non-interactive simulation. FIG. 3I illustrates an example screen display of a simulated customer service person, and further illustrates a "Skip Part 1" button which, when activated causes the non-interactive simulation to be skipped.

Figure 3K:

FIG. 3J illustrates an example screen display that further describes and provides instructions for the interactive simulation. FIG. 3K illustrates the visual portion of the interactive simulation, with an Error/Stop button (which can be otherwise labeled) used by User to indicate the occurrence of the Event of the type the User is asked to identify. FIG. 3L illustrates a first example quiz question in the form of a multiple-choice question. FIG. 3M illustrates an example screen display informing the User that the User selected the wrong answer in the quiz question illustrated in FIG. 3L. The User is prompted to try the quiz again, and a "try again" button is provided, which when activated, will cause the quiz in FIG. 3L to be displayed again. FIG. 3N illustrates an example screen display informing the User that the User again selected the wrong answer after attempting for the second time to correctly answer the quiz question illustrated in FIG. 3L. In addition, as illustrated in FIG. 3N, the correct answer is provided by highlighting the correct answer.

FIG. 3O illustrates an example screen display informing the User that the User selected the correct answer to a second multiple choice question. FIG. 3P illustrates an example screen display providing instructions with respect to an opportunity identification test. FIG. 3Q illustrates an example phrase identification question. FIG. 3R illustrates an example screen display notifying the User of a failure to identify an opportunity. A "Continue" button is provided, which causes a quiz to be presented. FIG. 3S illustrates an example screen display of a multiple choice quiz question relating to explaining why a certain customer phrase represents an opportunity. FIG. 3T illustrates an example screen display informing the User that the User selected the wrong answer in the quiz illustrated in FIG. 3S. The User is prompted to try the quiz again, and a "try again" button is provided, which when activated, will cause the quiz in FIG. 3S to be displayed again. FIG. 3U illustrates an example screen display informing the User that the User again selected the wrong answer after attempting for the second time to correctly answer the quiz question illustrated in FIG. 3S. In addition, as illustrated in FIG. 3U, the correct answer is provided by highlighting the correct answer.

FIG. 3V illustrates an example quiz question related to identifying the style of the customer service person in the simulation presentation. FIG. 3W illustrates an example screen display informing the User that the User selected the correct answer to the question illustrated in FIG. 3V.

FIG. 3X illustrates an example explanation of the potential subjectivity with respect to identifying errors and opportunities, and with respect to the quizzes. FIG. 3Y illustrates an example scoring screen display.

Of course, other user interfaces than the examples illustrated herein can be used as well.

Figure 5A:
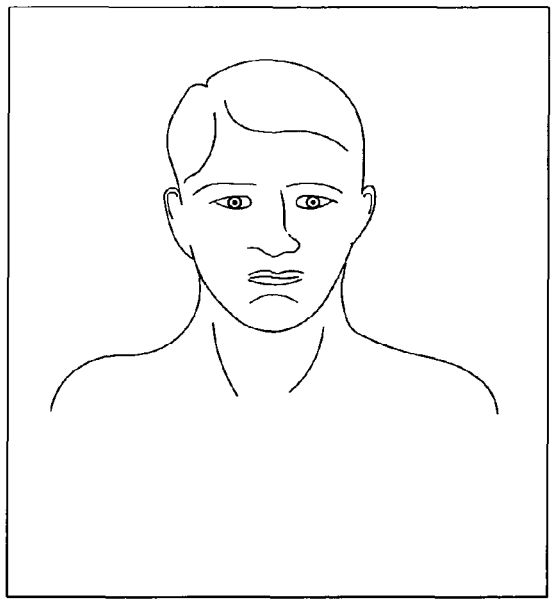
FIGS. 5A-V illustrate further example user interfaces.

FIGS. 5A-V illustrate additional example user interfaces for training personnel in the travel agency services field. In this example, a travel agent is interacting with a customer. The example visual component of the dramatic interaction is provided via animated figures sequenced with an audio track, although video sequences or real people can be used as well. Optionally, user accessible controls (e.g., rewind, pause, fast forward, play, resume, etc.) are provided to the trainee to allow the trainee to control the presentation. For example, many of the following interfaces include a pause control and a "go back" one screen control.

FIG. 5A is an initial introduction interface. FIG. 5B illustrates a user interface that provides trainee instructions. In this example, the trainee is informed that the conversation the trainee is about to be presented with is between a travel agent and a customer. The instructions further inform the trainee that certain travel agent statements contain errors, which the trainee needs to identify within 5 seconds after the error occurrence by clicking on the Stop button. The trainee is further informed that if the trainee correctly identifies an error, a quiz will be presented. The interface further explains that once the trainee answers the quiz, the conversation will resume. The trainee is also informed that if the trainee indicates an error where none occurred, the trainee's score will be negatively affected. The trainee is then instructed to click a Start button in order to initiate the presentation.

Figure 5C:
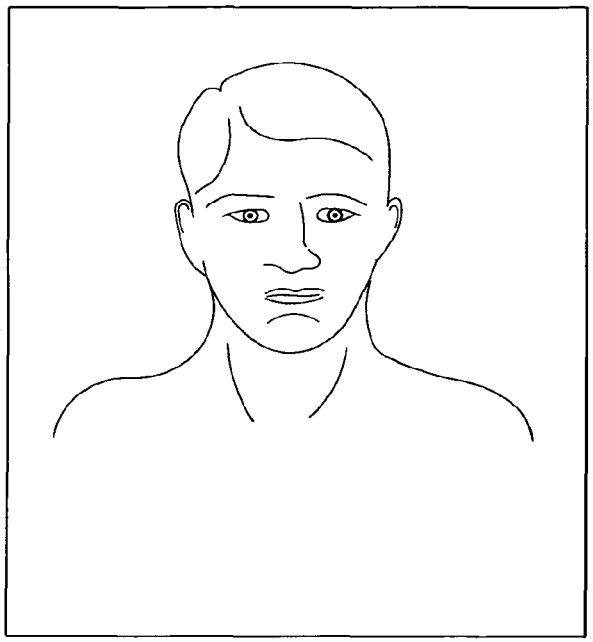
Figure 5D:
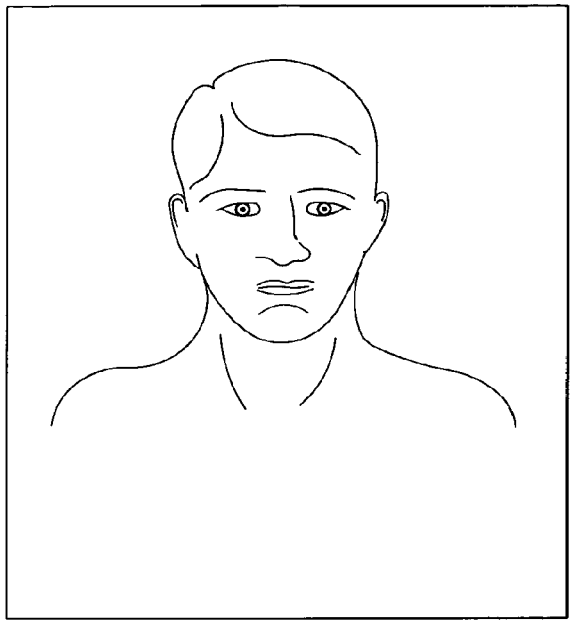
Figure 5E:
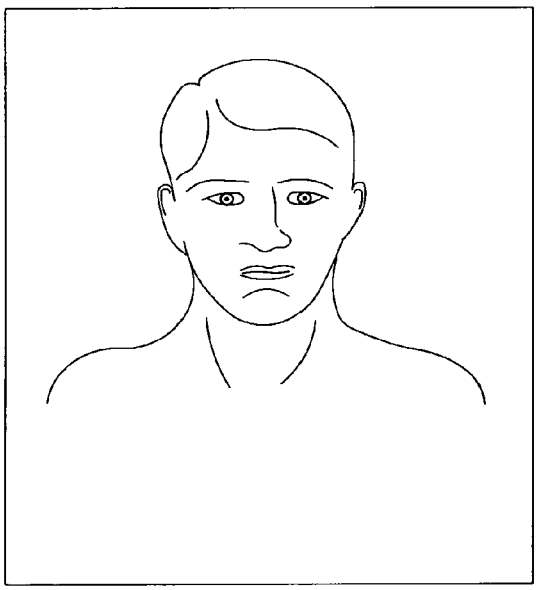

The example user interface illustrated in FIG. 5C provides a brief description of the conversation scenario. In this example, the user interface describes a conversation between two characters in a travel agency. The example user interface illustrated in FIG. 5D discusses the focus of the training module. In this example, the interface states the module focus in on error identification, and that the trainee is to identify errors strategically placed within the conversation. FIG. 5E states that in some modules the trainee will be given the opportunity to listen to an entire uninterrupted conversation, during which the trainee can take notes prior to an interactive portion, and in some modules, the trainee will not be given such an opportunity.

Figure 5F:
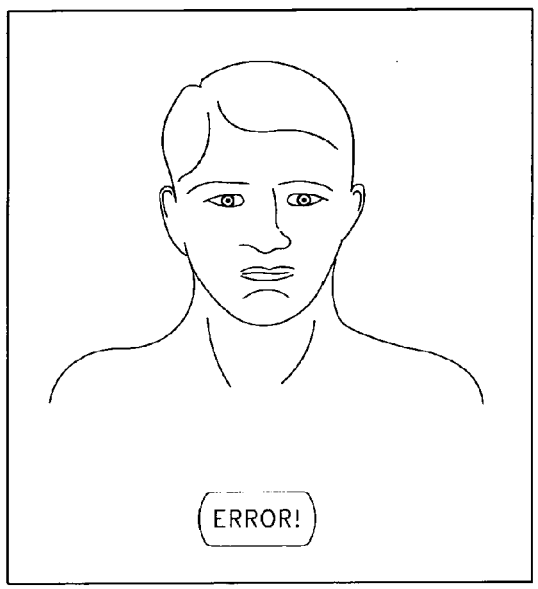
Figure 5G:
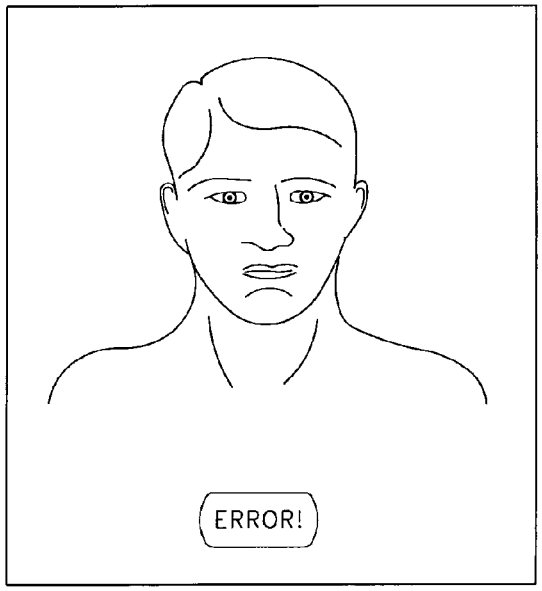
Figure 5H:
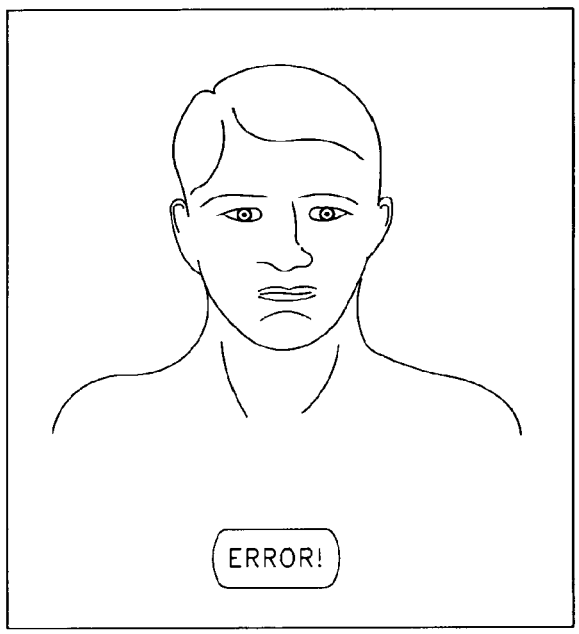

In FIG. 5F, the user interface instructs the trainee to click within a predefined area to identify an error within the conversation. FIG. 5G informs the trainee that if the trainee correctly identifies an error by clicking the mouse (or via other user input device) at the appropriate time, the training system will provide positive feedback by changing the color of a button (e.g., an Error button). The interface can also inform the trainee that the button related text will change to "Correct". The interface illustrated in FIG. 5H informs the trainee that if the trainee incorrectly identifies an error by clicking the mouse when there is no conversation error, the training system will provide negative feedback by changing the color of the button (e.g., an Error button) to red, and by changing the button related text (e.g., "OK" or blank text) to "Incorrect" or "Error".

Figure 5J:
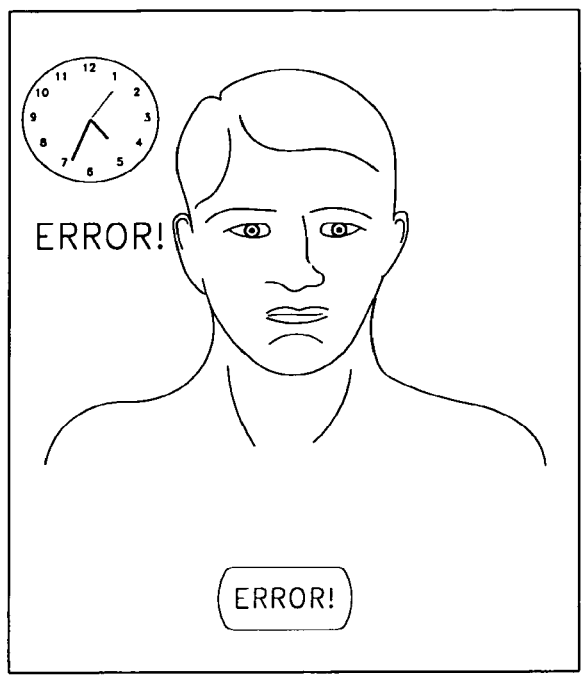

The interface illustrated in FIG. 5I informs the trainee of the time the trainee has to identify the error (5 seconds in this example). In this example, a tutorial conversation session is to be presented to the trainee and the interface informs the trainee that the error will be identified by the system to the trainee, and that a countdown clock (displaying the amount of time left for the trainee to identify the error) will be displayed. The interface further describes an error (misidentification of Ingrid Bergman's birthplace) that will occur during the course of the tutorial conversation. FIG. 5J illustrates the frame in which the error is spoken.

Figure 5K:
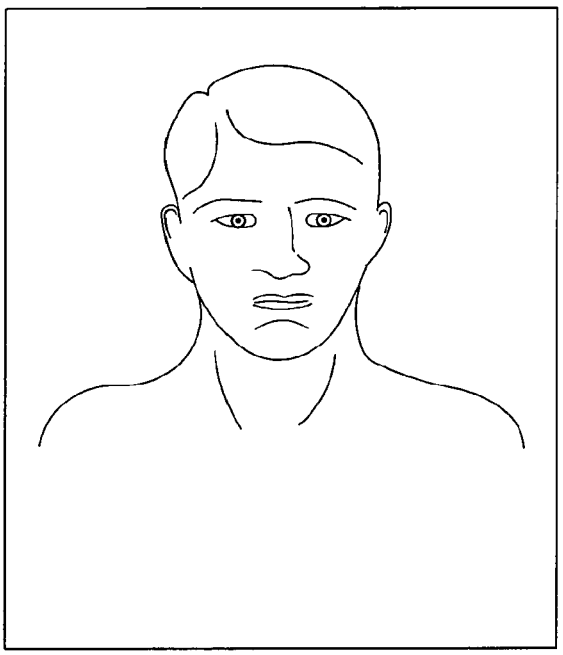
Figure 5M:
Figure 50:

The interface illustrated in FIG. 5K describes a multiple choice quiz tutorial, wherein a first quiz will be directed to the nature of the specific error, and a second quiz will ask the trainee to identify a correct alternative. The user interface illustrated in FIG. 5L provides an example first multiple choice tutorial quiz, wherein the user is asked to select from a plurality of error choices the erroneous statement made by the travel agent. FIG. 5M illustrates the system emulating a trainee answering the quiz illustrated in FIG. 5L. FIG. 5N illustrates a quiz wherein the trainee is to select what the correct statement would have been with respect to the erroneous travel agent statement. FIG. 5O illustrates the system emulating a trainee answering the quiz illustrated in FIG. 5N. FIG. 5P illustrates the system response if the trainee selects the wrong answer a second time, wherein the system highlights the correct answer. The user interface illustrated in FIG. 5P further includes a "Continue Conversation" control, which, when activated causes the system to continue playing the conversation. FIG. 5Q illustrates the system emulating a trainee selecting the "Continue Conversation" control.

Figure 5S:
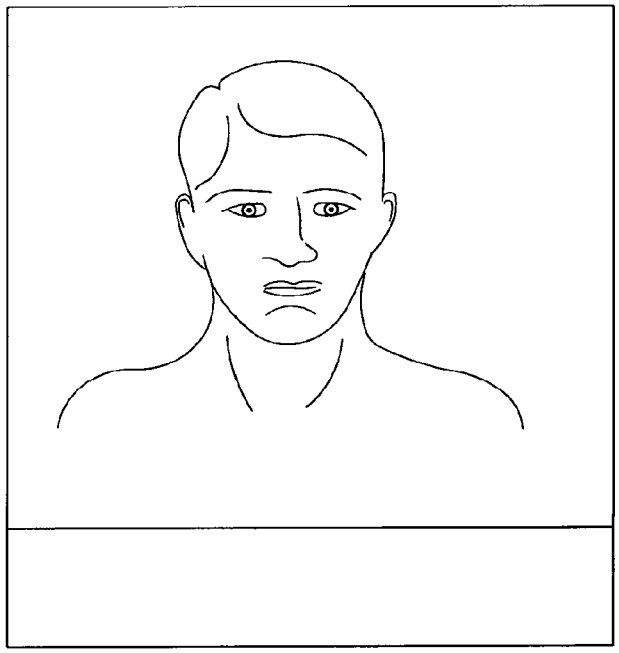

FIG. 5R illustrates an example user interface displayed the first time a trainee selects the wrong option in a quiz, wherein the trainee is provided two opportunities to select the correct option. FIG. 5S illustrates the conversation presentation resuming after the "Continue Conversation" control is activated.

FIG. 5T illustrates an example user interface that provides the trainee's scores. In this example, the interface displays the number of correctly identified errors out of how many errors, the number of incorrect error identifications (the number of times the trainee indicated an error occurred, when no error had occurred), and the number of quiz questions correctly answered out of how many quiz questions.

FIG. 5U illustrates an example user interface presented before the beginning of a practice session. FIG. 5V illustrates an example user interface displayed during an interactive session upon the user failing to identify an error, wherein the user interface inform the trainee that the presentation will replay the error for the trainee.

Thus, as described herein, certain embodiments enable trainees to better identify opportunities to better serve clients, to better capitalize on these opportunities, to better identify errors in service-related discussions/conversations, and to learn how to correct such errors. Further, systems and processes disclosed herein will enable trainees to better analyze the service needs of customers, clients, prospects, to better overcome objections to services suggested by the trainee to customer, prospects, and clients, to better and more appropriately finalize customer service interactions, and to better and more appropriately time manage service conversations. Certain embodiments can also make trainee families, spouses, and others learn to identify errors in their handling of personal relationships, to listen better to others, and to better manage their personal relationships.

Scenario A

Banker (B) and Customer (B) Interactions
Scenario #1
Phone Conversation
  Background Info. The banker has not provided his account number when the automated banker asks him to do so. He is told that if he does not know his account number, to wait on the line for the next representative.
  B: Good afternoon. This is Linda at XYZ bank. How can I help you?
  A: Hello Linda . . . can you tell me what a check from 3 months ago was made out to. I can provide you with the Check number, amount and date.
  B: Oh no . . . I can actually give you the check number, amount and date, but don't have access to the name to whom the check was made out to. What we can do is request a federal copy of the check for you. Have you ordered those before? (Error 1)
  Multiple-Choice—You can pick more than one answer.
  What did the banker fail to do?
    a. She failed to answer the client's question.
    b. She failed to verbally acknowledge the given sales/service opportunity.
    c. She failed to introduce herself properly.
    d. She failed to ask the client's name.
  Note: If the participant picks the correct answer d., a second multiple-choice question and answers will appear:
  If they pick the wrong answer, they are prompted to try again, until the right answer is presented by default.
    What should she have done?
    a. She should have asked the client for his name immediately after introducing herself.
    b. She should have asked client's name immediately after client's request for the check info.
    c. She should have asked for client's account number first, then used the name displayed.

d. She should have asked for client's social security number first, then pulled up their account with their name.

A: No, I haven't.

B: You get three per statement cycle, so this will be free of charge.

A: No kidding! That's the first time this bank has offered me anything for free.

B: Oh, really? I'm sorry to hear that. Let me get that check information and your social security number please. (Error 2)

What did the banker do wrong?
a. She failed to pick up on a hot topic.
b. She ignored the client's comment.
c. She failed to offer the client something for free.
d. She gave the client false information.

What was the hot topic?
a. The client could benefit from having his checks returned to him.
b. The client feels the bank charges for everything.
c. The client is dissatisfied with his current bank.
d. All of the above.

What could the banker have done differently?
a. She could have acknowledged the client's concern of spending too much and used this as a subject to weave into determining the client's needs.
b. She could have told the client that she would mail the cleared checks back to him.
c. She could have inquired about the comment that he doesn't receive "anything for free."
d. She could have informed the client of all of the bank's complimentary features.

A: My social is 769708868 and the check number was 1189. And it was for $378.86 and the date was Mar. 27, 2003.

B: Okay, Mr. Teale. You should receive the copy of that check in the mail sometime within the next week.

A: Oh great.

B: Now Mr. Teale, may I ask you a few questions regarding your financial needs today? (Error 3)

What did the banker do wrong?
a. She failed to make the appropriate introduction for the client interact.
b. She failed to offer cleared check return services to the client.
c. She failed to ask whether if the client was interested in image check services.
d. She failed to pre-position the marketing of products.

What could the banker have done?
a. Explained why they were transitioning into a discussion of the client's banking needs.
b. Explained how discussing the client's needs is important for building a relationship as well as a better understanding of the client's financial needs.
c. She could ask the client if this was an appropriate time to discuss the client's needs.
d. She could have mentioned the desirability of discussing the client's needs at the beginning at the time of introductions.

A: Okay. Is this going to be another one of those fees I'll find in my statement next month under Phone Banker charges?

B: No, not at all. This is an analysis we're doing with all of our clients. (Error 4)

What did the banker do wrong?
a. Failed to explain the importance of evaluating the client's needs thoroughly.
b. Failed to address the issue of Phone Banker fees.
c. Failed to recognize the client's frustration.
d. All of the above A: Okay.

B: Do you think that you or any members of your family will have a need to borrow any money, say, sometime within the next six to twelve months?

A: No, probably not. Our family is consumed with my sister's wedding that's coming up.

B: So your sister's getting married! Well, that's exciting.

A: Yeah, but you know, I was going to travel the country with my cousin Alfred. But as always, even at 72 years of age, the world's got to stop at her feet and when she asks for it.

B: Who's 72?

A: My sister!

B: Wow that's incredible! Good for her.

A: Our mother left us a trust, but we're using it up and her wedding is already putting a huge dent in it. It's no small wedding. I can tell you that much!

B: I understand. You know, we're here to help you if you or your sister should ever need help. (Error 5)

What did the banker do wrong?
a. She asked the first question incorrectly.
b. She ignored the comment about sister's upcoming marriage.
c. She didn't' acknowledge any of the several sales and service opportunities.
d. She failed to inquire about the trust left to her by her mother.

What could the banker have said to acknowledge the client's potential needs?
a. "It sounds like the wedding will be quite expensive and it's unfortunate that you're drying up your trust. Have you thought about taking out a loan?"
b. "Why don't you give me a grand total of expenses you expect to pay and we'll work out a loan for you."
c. "It sounds like you'll need a loan for your travel expenses after the wedding. Do you want to set up an appointment to talk?"
d. All of the above.

A: Thank-you. Okay, is that it?

B: No, just a couple more questions Mr. Teale, if that's okay with you?

A: Okay.

B: Do you have any deposits and/or investments besides what you have with us, elsewhere?

What did the banker do wrong?
a. She did not preposition the deposits and investments question.
b. She asked the question out of order.
c. She did not clarify what the client has currently at the bank.
d. All of the above A: No. Should I?

B: (laughs) No, we would like to keep you all to ourselves here at this bank. Now, besides the checking account and Savings accounts, check card and credit cards you have here do you have anything set up elsewhere?

A: No. I used to have an account with XYZ bank, but I closed it when I got separated from my wife.

B: And it's very nice to have you as a client indeed, Mr. Teale. (Error 6)

What did the banker do wrong?
a. She failed to inquire about the trust account.
b. She failed to explain the reason for asking the questions.
c. She failed to respect the client's possible time constraints.
d. She left the question asking for outside deposits and investments too soon.

A: Thank you.

B: That concludes the analysis. Is there anything else I can do for you today?

A: No, I look forward to getting the copy of that check soon.

B: Yes, it should arrive sometime within the next week at your home address.

A: Great.

B: No problem. Have a nice day.

A: Thank you very much.

B: You're very welcome. Bye bye.

A: Bye.

Scenario B

BANKER (B) AND CUSTOMER (B) INTERACTIONS

Directions: In this scenario, participant is told to click the STOP icon not just when an error has been made, but also when an opportunity clue leading to a potential sale and/or service has been identified.

Total # errors & opportunity clues=14

Background Info: The client is upset with an error that has recently occurred on her checking account. She has come into the branch because her previous attempts to correct the error over the phone have not proved efficient.

A: Hi, I have a major problem with my account, and I really want it fixed.

B: Sure what's STOP the problem? (Error 1)

True or False

The banker made the right move by immediately asking what the problem was.
 a. True
 b. False What should the banker have said instead?
 a. The banker should have shown more sympathy for the client's situation before asking for the specific problem.
 b. The banker should have asked for the client's name to pull up the relevant account.
 c. The banker should have introduced himself then asked the client's name to pull up the relevant account.
 d. All of the above.

A: A couple days ago, I withdrew $1000 from my account, and apparently you guys withdrew $2000 by mistake. So, now my account has a negative balance STOP. (Opportunity Clue 2)

What opportunity clue(s) did you hear?
 a. An opportunity for opening up a savings account.
 b. An opportunity to discuss better money management and budgeting plans.
 c. An opportunity to discuss assigning the client a personal relationship banker.
 d. All of the above.

What is the best method of discussing these opportunity clues?
 a. via teleconference
 b. via online banking
 c. via a structured needs discovery process
 d. All of the above A: (continues to speak) And I called yesterday and spoke to someone and they told me that it would be dropped off by the evening, so when I logged on again this morning and checked, I see nothing has changed. I'm still at a negative balance, and I have to pay my rent STOP tomorrow. (Opportunity Clue 3)

What opportunity clue(s) did you hear?
 e. An opportunity for opening up a savings account.
 f. An opportunity to discuss better money management.
 g. An opportunity to discuss assigning the client a personal relationship banker.
 h. All of the above.

B: Wow! I'm really sorry this has happened. Let me pull up your account. May I have your social security number please?

A: Yeah, okay it's 064616525.

B: Okay, I see what the problem is. It looks like since you withdrew the money after 4 pm, that the withdrawal wasn't posted until the next day, and in order to have it dropped off, it would have taken a day from the time the withdrawal was posted . . . the next transaction day. So, you should see a change by tonight.

A: Okay, but that's pretty much what I was told yesterday STOP and if I have to come back here again tomorrow, I'm not going to be very happy about this. I do work across the street so I will be back again if I have to. I really don't appreciate coming down here multiple times this week. (Opportunity Clue 4)

What opportunity clue or hidden message did you hear?
 a. an opportunity for opening up a Savings account.
 b. An opportunity to discuss better time-management.
 c. An opportunity to discuss assigning the client a private banker.
 d. All of the above.

B: Sure of course. Let me take your number and we'll call you to let you know what has happened. This problem should be fixed by midnight tonight. Meanwhile, I'm going to go ahead and credit your account $20.00 for the inconvenience. I think this is just a glitch in the system here, because you're not the only one it has happened to.

A: (sarcastic) Yeah, okay great. I guess $20.00 is great, but you know I've been with you guys for about 9 years now STOP and I really don't appreciate being treated this way. It'll be really easy to take my account to another bank that's offering me_$75 and a free checking account just to join them! (Opportunity Clue 5)

What opportunity clue or hidden message did you hear?
 a. The client has been shopping around.
 b. The client has recent reservations with the bank
 c. The client needs more compensation for what she's gone through.
 d. All of the above.

What topics should be addressed and when or how should they be discussed?
 a. the client's dissatisfaction with the current bank; the time to discuss them is now.
 b. The client's need for more compensation; the banker can talk about client's immediate credit needs, if needed.
 c. The client has been shopping around; the banker should bring up the services the bank can offer to meet the client's many ways.
 d. All of the above.

B: Sure I understand. We're going to look into this to make sure it doesn't happen again. You know . . . one thing that can help us out at this bank STOP is if you participate in a new analysis we're conducting with all of our clients. (Error 6)

What did the banker do wrong?
 a. introduced the client needs analysis at an inappropriate time.
 b. Did not pre-position the client needs analysis.
 c. Did not bother to ask if the client has enough time.
 d. Mentioned how the client needs analysis will help the bank, but not the client.

What should the banker have said instead?
 a. The banker should have asked the client for 4-5 minutes of their time to conduct a client needs analysis.
 b. Explained the purpose of the client needs analysis, as related to the enhancement of their services and relationship with the client.

c. Asked the banker when the right time to conduct a client needs analysis would be, and set an appointment A: What for?

B: It helps us get a better picture of how we can be more helpful to our client's financial needs. But the best way to find out is to take part in it. (Error 7)

True or False

The banker handled the objection well.
a. True
b. False

A: Look, I don't have long. I'm here on my lunch hour.

B: I promise this will not take long at all STOP and will be highly beneficial to you. (ERROR 8)

What should the banker have said or asked the client, that he hasn't?
 a. the banker could have asked for a better time to conduct a client needs analysis and set the appointment.
 b. The banker could have been honest about the time a client needs analysis can take, and then expressed the urgency of conducting one at the current time.
 c. The banker should specify the time it takes to conduct a client needs analysis.
 d. All of the above What is the duration of conducting a client needs analysis?
 a. 15 minutes including any additional questioning.
 b. 4-5 minutes for the initial part; an additional 4-5 more for additional questions
 c. 2-3 minutes for the initial part; an additional 2-3 more for additional questions.
 d. Any of the above A: Okay, but you guys made me a promise last night that you didn't keep!

B: I'm sorry I don't know who you talked to. They should have given you the facts, but because of this glitch in our system, everyone's kind of had a lot on their plate to deal with recently. I promise I will look into your situation, personally. Now, shall I start with the analysis? ERROR 9

What did the banker do wrong?
 a. Miss the opportunity for a service
 b. Ignore the client's frustration
 c. revealed the bank's glitch.
 d. Didn't ask who helped them.

What could have been done?
 a. a personal banker could be assigned to the banker to avoid future confusion and inconsistency.
 b. Acknowledged the client's frustration, by mirroring it (verbally repeating it with an empathetic remark).
 c. Assuring the client that she will be better taken care of after conducting the client needs analysis because there will be a better profile of her and her needs for the bank to build a relationship upon.
 d. All of the above.

A: Okay, but if it runs too long, I'm leaving in the middle.

B: No problem. Okay, Ms. Levy, for starters, do you or any of your family members have a need STOP to take out any loans, sometime between now and next year? (ERROR 10)

What did the banker do wrong?
 a. Asked the wrong question first.
 b. Didn't define the purpose of the question before asking it.
 c. Re-asked the question when the participant had already answered that there were no needs.
 d. Did not ask about specific areas where a loan may be considered A: No, not really.

B: Okay, so there are no borrowing needs STOP that we can look at today? (Error 11)

True or False

The banker should have given specific types of loan examples and given a detailed account of each to confirm that the client does not have any borrowing needs with respect to the loans the bank offers.
a. True
b. False A: Not that I can think of, no.

B: Okay, do you have any deposits STOP and/or investments at any other financial institution? (Error 12)

True or False

The banker pre-positioned the question well.
a. True
b. False

What could the banker have said?
 a. In order to help you consolidate any of your outside accounts here with your accounts at this bank, can you tell me what deposits and investments you may have elsewhere?
 b. In order to help simplify your financial life, can you tell me what investments/deposits, you have elsewhere?
 c. In order to help you simplify your financial life through consolidation of accounts where appropriate in an attempt to save you time and money, can you tell me what investments/deposits, you have elsewhere?

A: No, just with your establishment.

B: What about credit cards, STOP check cards, Savings or Checking accounts, aside from what you have here with us? (Error 13)

True or False

The client did not pre-position the question well.
a. True
b. False

A: Nope . . . all I have is what you have on your screen there.

B: Alright . . . well, I have to conclude the analysis STOP here because it looks like there isn't much we can look at today. (ERRORS 14)

True or False

The banker has reached an adequate conclusion after analyzing the client.
a. True
b. False What did the banker do wrong?
 a. He rushed the client needs analysis process without thoroughly analyzing the client's needs.
 b. He missed all opportunities for potential sales and services that could have met the client's needs.
 c. He did not give any rationales for asking any of the client needs analysis probes or pre-position the client needs analysis process well.
 d. All of the above.

A: I'm pretty happy that it was quick just like you said it would be.

B: Yes, and I am so sorry about what has occurred. We'll be staying in touch. Good luck.

A: Yeah thanks. I look forward to the withdrawal to be dropped off by midnight tonight.

B: Yes, it will be dropped off no later than tonight.

A: Okay, I appreciate your help.

B: Pleasure is mine. Bye Ms. Levy.

Scenario C

Travel Agent (X) and Client (Y) Interactions

X1

Welcome to The Alternate Learning Travel Agency. What can we do for you today?

Y1
I am a movie buff and am interested in traveling to Europe for a week this summer.
X2 (Error)
Well, I'd recommend you go see the birthplace of Ingrid Bergman in Finland. The weather there is stunning during the summer months.

I. Quiz 1A

Q: Where was Ingrid Bergman born?
  A Turkey
  B Norway
  C Sweden
  D Iceland

II. Quiz 1B

Q: Which body of water lies to the east of Sweden?
  A The Baltic Sea
  B The Caspian Sea
  C The Red Sea
  D The Dead Sea
X2C (Corrected)
Well, I'd recommend you go see he birthplace of Ingrid Bergman in Sweden. The weather there is stunning during the summer months.
Y2
Well actually, one of my favorite movies is La Strada with Anthony Quinn.
X3
Quinn was born in Mexico, but we can send you Italy, where the movie was made.
Y3
That sounds quite exciting.
X4 (Error)
We have 4 destination specials at the moment; Naples in the South, Bolzano in the mountains, Milan on the beach, or Venice by the canals.

III. Quiz 2A

Q: Which of these facts is wrong?
  a. A Naples is in the south of Italy
     B Milan is on the coast
     i. C Bolzano is in the Alps
     D Venice has canals
  2. Quiz 2B
     Q: What island lies off the southern tip of Italy?
        A Corsica
        B Sardini
        C Sicily
     B. D Crete
X4C (Corrected)
We have 4 destination specials at the moment; Naples in the South, Bolzano in the mountains, Milan in the North, or Venice by the canals.
Y4
How about France?
X5
Well there is always the Riviera. You've got Nice and St. Tropez which can be pricey, or we can send you on a wine tour starting in Bordeaux in the west.
Y5
Oh, I absolutely love wine.
X6 (Error)
If you love wine, you'll love this trip we have to the Champagne caves in Burgundy.

IV. Quiz 3A

Q: Where are the Champagne caves?
  A Reims
  (a) B Champagne
  C Both of the above
  ii. D None of the above

V. Quiz 3B

Q: In the list below, which is the nearest city to where champagne is made?
  A Paris
  a. B Tolouse
  C Marseille
  D Lyon
X6C (Correct)
If you love wine, you'll love this trip we have to the Champagne caves northeast of Paris.
Y6
How long will it take me to get to Paris from Los Angeles?
X7 (ERROR)
The flight is very pleasant and should take you no longer than 9 hours non-stop. What day would you like to depart?

VI. Quiz 4A

Q: How long is a non-stop flight form Los Angeles to Paris?
  A 10.5 hrs
  B 11.5 hrs.
  C 12.5 hrs.
  D None of the above

VII. Quiz 4B

Q: How far is Los Angeles from Paris?
  i. A 4090 miles
  B 3923 miles
  C 8012 miles
  D 6159 miles
X7C (Correct)
The flight is very pleasant and should take you ten and a half hours non-stop. What day would you like to depart?
End

Scenario D

Travel Agent (X) and Client (Y) Interactions
X1
Welcome to the Advanced Listening Travel Agency! What can we do for you today?
Y1
I am a movie buff and am interested in traveling to Europe for a week this summer.
X2
Well, I'd recommend you go see the birthplace of Ingrid Bergman in Finland. The weather there is stunning during the summer months.
Quiz 1A
What is the error?
A. Ingrid Bergman was born in Finland.
B. The weather in Finland is stunning during the summer months.
C. Ingrid Bergman was born.

D. A&B
What should the Travel Agent have said instead?
A. Ingrid Bergman was born in Norway.
B. Ingrid Bergman was born in Paris.
C. Ingrid Bergman was born in Sweden.
D. To this day, the birthplace of Ingrid Bergman remains a mystery.
Y2
Well actually, one of my favorite movies is La Strada with Anthony Quinn.
X3
Quinn was born in Mexico, but we can send you Italy, where the movie was made.
Y3
That sounds quite exciting.
X4
We have 4 destination specials at the moment:
Sicily in the South,
Rome, which is the capital,
Milan, which is on the beach,
or Venice by the canals.
Quiz 2A
What is the Error?
A. Sicily is in the South of Italy.
B. Milan is on the beach.
C. Venice is by the canals.
D. Rome is the capital of Italy.
Quiz 2B
What could the Travel Agent have said about Milan?
A. Milan is the Italian Riviera.
B. Milan is a town in Rome.
C. Milan is the name of Venice's famous canal.
D. Milan is in Northern Italy.
 Y4
 How about France?
X5
Well there is always the Riviera. You've got Nice and St. Tropez on the Mediterranean, which can be pricey, or we can send you on a wine tour starting in Bordeaux in the west.
Y5
Oh, I absolutely love wine.
X6
If you love wine, you'll love this trip we have to the Champagne caves in Burgundy. It is one of our most popular trips.
Quiz 3A
What is the Error?
A. The Travel Agent assumes the Client loves wine.
B. The Travel Agent claims that this is one of their "most popular trips."
C. Champagne Caves are in Burgundy.
D. A&B
Quiz 3B
What could the Travel Agent have said instead?
A. Champagne caves can be found in Reims.
B. Champagne caves can be found in Champagne.
C. Champagne caves can be found in Tuscany.

VIII. D. A&B a. Y6
Well, I've never been a fan of Champagne . . . a little pretentious if you ask me. I think I'd like to go to Rome instead.
X7
All right then! Let's see what we have available to France. When would you like to travel?
Quiz 4A
What is the Error?
A. The Travel Agent assumes the responsibility of looking for available dates of travel.
B. The Travel Agent says he will look for flight availability to France.
C. The Travel Agent asks the Client when she would like to travel.
D. All of the Above.
Quiz 4B
What does this Error say about the Travel Agent and how what could he have said instead?
A. The Travel Agent could be distracted. He could have offered to look at availabilities to Rome.
B. The Travel Agent hasn't heard what his Client has said. He could have offered to look at availabilities to Rome.
C. The Travel Agent doesn't care about the Client's wish. He could have offered to look at availabilities to Milan.
D. A&B
End
It should be understood that certain variations and modifications of this invention would suggest themselves to one of ordinary skill in the art. The scope of the present invention is not to be limited by the illustrations or the foregoing descriptions thereof.

What is claimed is:
1. A method of training a user using an interactive electronic training system, the method comprising:
causing, via the interactive electronic training system, a first training presentation of a first interaction of at least two people to be presented;
instructing the user to identify at least one interaction error event presented in the first training presentation;
determining, by the interactive electronic training system, if the user identified during the first training presentation an occurrence of a first interaction error event within a first window period,
wherein the first window period occurs during the first training presentation and the first training presentation is continuously played during the first window period;
providing, by the interactive electronic training system, the user with positive feedback at least partly in response to determining that the user identified the occurrence of the first interaction error within the first window period; and
at least partly in response to determining that the user did not identify the occurrence of the first interaction error event within the first window period:
automatically replaying, by the interactive electronic training system, at least a portion of the first interaction that was presented during the first training presentation,
wherein the portion of the first interaction includes at least the first interaction error event.
2. The method as defined in claim 1, the method further comprising:
pausing the first training presentation and presenting at least a first quiz to the user, the first quiz related to the first interaction error;
receiving the user's response to the first quiz;
presenting a second quiz to the user, wherein the user is to identify a statement or phrase spoken by a first individual during the first interaction, which represented opportunities that were missed by a second individual in the first interaction;
receiving the user's response to the second quiz; and scoring the user's performance based at least in part on the user's first quiz response and the user's second quiz response.

3. The method as defined in claim 2, further comprising causing substantially immediate feedback to be provided to the user when the user correctly answers the first quiz.

4. The method as defined in claim 2, further comprising causing the first quiz to be presented to the user a second time if the user does not correctly answer the first quiz the first time.

5. The method as defined in claim 1, wherein the first interaction error event is an error of omission on the part of one of the people or an opportunity presented by a first person that was not addressed by a second person.

6. The method as defined in claim 1, further comprising providing a textual and/or audible notice to the user at least partly in response to determining that the user did not identify the first interaction error event within the first window period, wherein the notice is presented less than 10 seconds after the first interaction error event.

7. The method as defined in claim 1, further comprising:
causing an icon to be displayed to the user during the first interaction; and
causing the icon to change colors at least partly in response to the user identifying the first interaction error event within the first window period.

8. The method as defined in claim 1, wherein the first window period is a predetermined amount of time.

9. The method as defined in claim 1, wherein the first window period is scheduled based at least in part on the an end of a sentence, phrase or concept being presented.

10. The electronic training system as defined in claim 1, wherein the first training presentation is transmitted from a server remote to a user terminal.

11. The electronic training system as defined in claim 1, wherein the first training presentation is stored in computer readable memory on a user terminal.

12. The method as defined in claim 1, wherein the at least two people are real people or animations representing people.

13. An electronic training system, the electronic training system comprising:
at least one computing device;
computer readable memory storing a first training module, wherein
the first training module includes a presentation of an interaction between at least two individuals, the presentation having associated metadata that indicates events within the presentation of the interaction between at least two individuals to be user identified, and
computer readable memory storing a program that when executed by the at least one computing device is configured to cause the at least one computing device to perform operations comprising:
causing the presentation to be presented to a user;
determining, using at least a portion of the metadata associated with the presentation, if the user identified, while the presentation is being presented, a first of the events within a first window of time, where the first window of time occurs during the presentation and the presentation is continuously played during the first window of time;
providing a first score if the user identified the first event within the first window of time, and storing the first score in computer readable memory;
causing a first related test to be presented to the user, wherein the first related test is related to the first event;
receiving a user response to the first related test;
evaluating the user response to the first related test;
based at least in part on the evaluation of the user response to the first related test, generating a second score;
storing the second score in computer readable memory; and
presenting at least one score to the user, wherein the at least one score is based at least in part on the second score.

14. The electronic training system as defined in claim 13, wherein the electronic training system is configured to performing operations comprising:
presenting an icon with a first color to the user during at least a portion of the presentation;
causing the icon to be presented with a second color at least partly in response to the user identifying the first event.

15. The electronic training system as defined in claim 13, wherein the first event is an error of omission on the part of a first individual in the presentation or an active error committed by a first individual in the presentation.

16. The electronic training system as defined in claim 13, wherein the first event is an opportunity presented by one of the individuals in the presentation that was not addressed by another individual in the presentation.

17. The electronic training system as defined in claim 13, wherein the electronic training system is further configured to perform operations comprising:
providing a textual and/or audible notice to the user at least partly in response to determining that the user did not identify the first event within the first window of time,
wherein the notice is presented less than 10 seconds after the first event.

18. The electronic training system as defined in claim 13, wherein the electronic training system is further configured to perform operations comprising providing substantially immediate feedback to the user when the user correctly completes the first related test.

19. The electronic training system as defined in claim 13, wherein the electronic training system is further configured to perform operations comprising presenting to the user at least a portion of the first related test a second time if the user does not correctly respond to the first related test the first time.

20. The electronic training system as defined in claim 13, wherein the electronic training system is further configured to perform operations comprising accessing and presenting a style question stored in computer readable memory, wherein the style question is related to the communication style and/or attitude of at least one of the individuals in the presentation.

21. The electronic training system as defined in claim 13, wherein the electronic training system is further configured to perform operations comprising assigning an adverse score if the user did not identify the first event within the first window of time.

22. The electronic training system as defined in claim 13, wherein the first window of time is scheduled based at least in part on the an end of a sentence, phrase or concept being presented.

23. The electronic training system as defined in claim 13, wherein the electronic training system is further configured to perform operations comprising causing the presentation to be first presented to the user in a non-interactive mode, wherein the user is not asked to identify events during the non-interactive presentation.

24. The electronic training system as defined in claim 13, further comprising a user terminal.

25. The electronic training system as defined in claim 13, wherein the presentation includes both an audio component and a video component.

26. The electronic training system as defined in claim 13, wherein the at least one score is a cumulative score based at least in part on the first score and the second score.

* * * * *

UNITED STATES PATENT AND TRADEMARK OFFICE
CERTIFICATE OF CORRECTION

PATENT NO.         : 8,565,668 B2
APPLICATION NO.    : 13/300496
DATED              : October 22, 2013
INVENTOR(S)        : Cohen Page 1 of 2

It is certified that error appears in the above-identified patent and that said Letters Patent is hereby corrected as shown below:

In the Drawings:

Sheet 5 of 56 (FIG. 3C) at line 7, Change "converstaion" to --conversation--.

Sheet 5 of 56 (FIG. 3C) at line 14, Change "opportunites." to --opportunities.--.

Sheet 8 of 56 (FIG. 3F) at line 17, Change "opportunit" to --opportunities--.

Sheet 10 of 56 (FIG. 3H) at line 4, Change "ntoes." to --notes.--.

Sheet 18 of 56 (FIG. 3P) at line 4, Change "opportunites," to --opportunities,--.

Sheet 26 of 56 (FIG. 3X) at line 5, Change "scenarious" to --scenarios--.

Sheet 27 of 56 (FIG. 3Y) at line 11, Change "opportunites)" to --opportunities)--.

Sheet 31 of 56 (FIG. 4D) at line 2 (Reference Numeral 401d), Change "OCCURANCE" to --OCCURRENCE--.

Sheet 31 of 56 (FIG. 4D) at line 1 (Reference Numeral 412d), Change "CONTNUE" to --CONTINUE--.

Sheet 43 of 56 (FIG. 5I) at line 14, Change "ALOTTED" to --ALLOTTED--.

Sheet 43 of 56 (FIG. 5I) at line 14, Change "ALLOTED." to --ALLOTTED.--.

In the Specification:

In column 2 at line 7, Change "skills)" to --skills).--.

In column 2 at line 12, Change "skills" to --skills.--.

In column 2 at line 15, Change "skills" to --skills.--.

In column 6 at line 4, Change "then" to --than--.

In column 6 at line 23, Change "skills" to --skills.--.

In column 6 at line 27, Change "skills" to --skills.--.

In column 6 at line 31, Change "skills" to --skills.--.

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,565,668 B2

In the Specification:

In column 23 at line 47, Change "400Dn," to --$400d_n$,--.

In column 35 at line 52, Change "Sadini" to --Sadinia--.

In column 36 at line 17, Change "Tolouse" to --Toulouse--.

In column 36 at line 31, Change "form" to --from--.

In the Claims:

In column 39 at line 30, In Claim 9, change "the an" to --an--.

In column 40 at line 58, In Claim 22, change "the an" to --an--.

UNITED STATES PATENT AND TRADEMARK OFFICE
CERTIFICATE OF CORRECTION

Page 1 of 2

| | |
|---|---|
| PATENT NO. | : 8,565,668 B2 |
| APPLICATION NO. | : 13/300496 |
| DATED | : October 22, 2013 |
| INVENTOR(S) | : Cohen |

It is certified that error appears in the above-identified patent and that said Letters Patent is hereby corrected as shown below:

On the title page, in the illustrative figure, line 14 "ALOTTED" should read --ALLOTTED--.

In the Drawings:

Sheet 5 of 56 (FIG. 3C) at line 7, Change "converstaion" to --conversation--.

Sheet 5 of 56 (FIG. 3C) at line 14, Change "opportunites." to --opportunities.--.

Sheet 8 of 56 (FIG. 3F) at line 17, Change "opportunit" to --opportunities--.

Sheet 10 of 56 (FIG. 3H) at line 4, Change "ntoes." to --notes.--.

Sheet 18 of 56 (FIG. 3P) at line 4, Change "opportunites," to --opportunities,--.

Sheet 26 of 56 (FIG. 3X) at line 5, Change "scenarious" to --scenarios--.

Sheet 27 of 56 (FIG. 3Y) at line 11, Change "opportunites)" to --opportunities)--.

Sheet 31 of 56 (FIG. 4D) at line 2 (Reference Numeral 401d), Change "OCCURANCE" to --OCCURRENCE--.

Sheet 31 of 56 (FIG. 4D) at line 1 (Reference Numeral 412d), Change "CONTNUE" to --CONTINUE--.

Sheet 43 of 56 (FIG. 5I) at line 14, Change "ALOTTED" to --ALLOTTED--.

Sheet 43 of 56 (FIG. 5I) at line 14, Change "ALLOTED." to --ALLOTTED.--.

In the Specification:

In column 2 at line 7, Change "skills)" to --skills).--.

In column 2 at line 12, Change "skills" to --skills.--.

In column 2 at line 15, Change "skills" to --skills.--.

This certificate supersedes the Certificate of Correction issued September 9, 2014.

Signed and Sealed this
Thirtieth Day of September, 2014

Michelle K. Lee
*Deputy Director of the United States Patent and Trademark Office*

In the Specification:

In column 6 at line 4, Change "then" to --than--.

In column 6 at line 23, Change "skills" to --skills.--.

In column 6 at line 27, Change "skills" to --skills.--.

In column 6 at line 31, Change "skills" to --skills.--.

In column 23 at line 47, Change "400Dn," to --400$d_n$,--.

In column 35 at line 52, Change "Sadini" to --Sadinia--.

In column 36 at line 17, Change "Tolouse" to --Toulouse--.

In column 36 at line 31, Change "form" to --from--.

In the Claims:

In column 39 at line 30, In Claim 9, change "the an" to --an--.

In column 40 at line 58, In Claim 22, change "the an" to --an--.